United States Patent
Taya et al.

(10) Patent No.: US 12,319,852 B2
(45) Date of Patent: *Jun. 3, 2025

(54) METHOD OF BONDING WITH ADHESIVE SHEETS FOR HIGH-FREQUENCY DIELECTRIC HEATING

(71) Applicant: LINTEC CORPORATION, Tokyo (JP)

(72) Inventors: Naoki Taya, Tokyo (JP); Sou Miyata, Tokyo (JP)

(73) Assignee: LINTEC CORPORATION, Tokyo (JP)

(*) Notice: Subject to any disclaimer, the term of this patent is extended or adjusted under 35 U.S.C. 154(b) by 210 days.

This patent is subject to a terminal disclaimer.

(21) Appl. No.: 17/915,449

(22) PCT Filed: Mar. 26, 2021

(86) PCT No.: PCT/JP2021/012959
§ 371 (c)(1),
(2) Date: Sep. 28, 2022

(87) PCT Pub. No.: WO2021/200687
PCT Pub. Date: Oct. 7, 2021

(65) Prior Publication Data
US 2023/0142250 A1  May 11, 2023

(30) Foreign Application Priority Data

Mar. 31, 2020 (JP) ................................. 2020-063433

(51) Int. Cl.
*C09J 7/35* (2018.01)
*C09J 5/06* (2006.01)
*C09J 11/04* (2006.01)

(52) U.S. Cl.
CPC . *C09J 7/35* (2018.01); *C09J 5/06* (2013.01); *C09J 11/04* (2013.01);
(Continued)

(58) Field of Classification Search
CPC ....... C09J 7/35; C09J 5/06; C09J 11/04; C09J 2301/304; C09J 2301/408; C09J 2425/008;
(Continued)

(56) References Cited

U.S. PATENT DOCUMENTS

2020/0087541 A1* 3/2020 Ishikawa .................. B32B 7/12

FOREIGN PATENT DOCUMENTS

| CN | 110300782 A | 10/2019 |
| CN | 110494525 A | 11/2019 |

(Continued)

OTHER PUBLICATIONS

Extended European Search Report received in European Patent Application No. 21780109.1 dated May 7, 2024.
(Continued)

*Primary Examiner* — S. Behrooz Ghorishi
(74) *Attorney, Agent, or Firm* — Rimon P.C.

(57) ABSTRACT

A bonding method using adhesive sheets respectively containing first and second thermoplastic resins. The volume content VA1 of the first thermoplastic resin in the adhesive sheet and the volume content VA2 of the second thermoplastic resin in the adhesive sheet are from 60 vol % to 100 vol %. Change rates Vx1 and Vx2 represented by formulae below are less than 80%. VB1 is the volume content of the first thermoplastic resin in a layer in direct contact with the first adhesive layer, and VB2 is the volume content of the second thermoplastic resin in a layer in direct contact with the second adhesive layer. The method includes applying a high-frequency wave to the adhesive sheets between adherends to bond them together, (Continued)

$Vx1=\{(VA1-VB1)/VA1\}\times 100$ (Numerical Formula 1)

$Vx2=\{(VA2-VB2)/VA2\}\times 100$ (Numerical Formula 2).

10 Claims, 6 Drawing Sheets

(52) U.S. Cl.
CPC .... *C09J 2301/304* (2020.08); *C09J 2301/408* (2020.08); *C09J 2425/008* (2013.01); *C09J 2433/008* (2013.01)

(58) Field of Classification Search
CPC .......... C09J 2433/008; C09J 2301/1242; C09J 2301/208; C09J 2301/416; C09J 2423/00; C09J 2423/006; C09J 2425/006; C09J 2453/00; C09J 123/10; C09J 7/10; C09J 123/0853; C08K 3/14; C08K 3/34; C08K 2003/2237; C08K 2003/2296; B29C 65/32
See application file for complete search history.

(56) References Cited

FOREIGN PATENT DOCUMENTS

| | | |
|---|---|---|
| EP | 4129657 A1 | 2/2023 |
| EP | 4129661 A1 | 2/2023 |
| EP | 4129663 A1 | 2/2023 |
| JP | S58-174474 A | 10/1983 |
| JP | H08-258173 A | 10/1996 |
| JP | H08-281873 A | 10/1996 |
| JP | 2014-37489 A | 2/2014 |
| WO | 2018/186297 A1 | 10/2018 |

OTHER PUBLICATIONS

English translation of the International Preliminary Report on Patentability issued in corresponding International Patent Application No. PCT/JP2021/012959, dated Sep. 29, 2022.

International Search Report issued in corresponding International Patent Application No. PCT/JP2021/012959, dated Jun. 22, 2021, with English translation.

First Office Action received in Chinese Patent Application No. 202180025953.1, dated Dec. 21, 2023.

* cited by examiner (A)

(B)

(C)

METHOD OF BONDING WITH ADHESIVE SHEETS FOR HIGH-FREQUENCY DIELECTRIC HEATING

CROSS REFERENCE TO RELATED APPLICATIONS

This patent application is the U.S. National Phase under 35 U.S.C. § 371 of International Application No. PCT/JP2021/012959, filed on Mar. 26, 2021, which claims the benefit of Japanese Patent Application No. 2020-063433, dated Mar. 31, 2020, the entire contents of each are hereby incorporated by reference in their entirety.

TECHNICAL FIELD

The present invention relates to a method of bonding using high-frequency dielectric heating adhesive sheets.

BACKGROUND ART

In one recently proposed method of bonding adherends that are generally not easily bonded together, for example, an adhesive prepared by mixing a heat-generating material into a prescribed resin is interposed between the adherends, and then dielectric heating, induction heating, ultrasonic welding, or laser welding is performed.

For example, Patent Literature 1 discloses a sheet-shaped thermal adhesive containing at least one fine powder selected from the group consisting of carbon black, silicon oxide, metals, and metal oxides.

CITATION LIST

PATENT LITERATURE(S)
Patent Literature 1: JP 58-174474 A

SUMMARY OF THE INVENTION

Problem(s) to be Solved by the Invention

When the thermal adhesive described in Patent Literature 1 is used to bond adherends (a first adherend and a second adherend) made of different materials together, sufficient adhesion strength may not be obtained. In particular, when the adherends are made of materials that are not easily bondable, sufficient adhesion strength is not easily obtained.

It is an object of the invention to provide a method of bonding using high-frequency dielectric heating adhesive sheets that can firmly bond first and second adherends formed of different materials together.

Means for Solving the Problem(s)

One aspect of the invention provides a bonding method of bonding together a first adherend and a second adherend made of a material different from a material forming the first adherend using a plurality of high-frequency dielectric heating adhesive sheets, in which
the plurality of high-frequency dielectric heating adhesive sheets include at least a first adhesive sheet and a second adhesive sheet,
the first adhesive sheet contains a first thermoplastic resin,
the second adhesive sheet contains a second thermoplastic resin,
the first thermoplastic resin and the second thermoplastic resin are different resins,
a volume content VA1 of the first thermoplastic resin with respect to total volume of all thermoplastic resins in the first adhesive sheet is in a range from 60% by volume to 100% by volume,
a volume content VA2 of the second thermoplastic resin with respect to total volume of all thermoplastic resins in the second adhesive sheet is in a range from 60% by volume to 100% by volume,
a change rate Vx1 represented by a numerical formula (Numerical Formula 1) below and indicating a rate of change between the volume content VA1 of the first thermoplastic resin and a volume content VB1 of the first thermoplastic resin with respect to total volume of all thermoplastic resins in a sheet disposed so as to be in direct contact with the first adhesive sheet is less than 80%,
a change rate Vx2 represented by a numerical formula (Numerical Formula 2) below and indicating a rate of change between the volume content VA2 of the second thermoplastic resin and a volume content VB2 of the second thermoplastic resin with respect to total volume of all thermoplastic resins in a sheet disposed so as to be in direct contact with the second adhesive sheet is less than 80%, and
the bonding method includes:
disposing the first adhesive sheet and the second adhesive sheet between the first adherend and the second adherend such that the first adhesive sheet is in contact with the first adherend and the second adhesive sheet is in contact with the second adherend; and
applying a high-frequency wave to the first adhesive sheet and the second adhesive sheet with the first adhesive sheet and the second adhesive sheet held between the first adherend and the second adherend to thereby bond the first adherend and the first adhesive sheet together and bond the second adherend and the second adhesive sheet together.

$Vx1=\{(VA1-VB1)/VA1\}\times100$     (Numerical Formula 1)

$Vx2=\{(VA2-VB2)/VA2\}\times100$     (Numerical Formula 2)

Preferably, in the method of bonding using high-frequency dielectric heating adhesive sheets according to the above aspect of the invention, the first adherend contains a third thermoplastic resin, the second adherend contains a fourth thermoplastic resin, a main component of the first thermoplastic resin is the same as a main component of the third thermoplastic resin, and a main component of the second thermoplastic resin is the same as a main component of the fourth thermoplastic resin.

Preferably, in the method of bonding using high-frequency dielectric heating adhesive sheets according to the above aspect of the invention, an intermediate sheet is further disposed between the first adhesive sheet and the second adhesive sheet.

Preferably, in the method of bonding using high-frequency dielectric heating adhesive sheets according to the above aspect of the invention, the intermediate sheet is in direct contact with at least one of the first adhesive sheet or the second adhesive sheet.

Preferably, in the method of bonding using high-frequency dielectric heating adhesive sheets according to the above aspect of the invention, the intermediate sheet contains the first thermoplastic resin and the second thermoplastic resin.

Preferably, in the method of bonding using high-frequency dielectric heating adhesive sheets according to the above aspect of the invention, the sheet in direct contact with the first adhesive sheet is the second adhesive sheet.

Preferably, in the method of bonding using high-frequency dielectric heating adhesive sheets according to the above aspect of the invention, at least one of the first adhesive sheet or the second adhesive sheet contains a dielectric filler that generates heat under application of a high-frequency wave.

Preferably, in the method of bonding using high-frequency dielectric heating adhesive sheets according to the above aspect of the invention, at least one of a volume content of the dielectric filler in the first adhesive sheet or a volume content of the dielectric filler in the second adhesive sheet is in a range from 5% by volume to 50% by volume.

Preferably, in the method of bonding using high-frequency dielectric heating adhesive sheets according to the above aspect of the invention, at least one of the dielectric filler in the first adhesive sheet or the dielectric filler in the second adhesive sheet contains at least one selected from the group consisting of zinc oxide, silicon carbide, titanium oxide, and barium titanate.

Preferably, in the method of bonding using high-frequency dielectric heating adhesive sheets according to the above aspect of the invention, at least one of a volume average particle size of the dielectric filler in the first adhesive sheet or a volume average particle size of the dielectric filler in the second adhesive sheet is in a range from 1 μm to 30 μm, and the volume average particle size is determined by measuring a particle size distribution by a laser diffraction/scattering method and computing the volume average particle size according to JIS Z 8819-2:2001 from results of the measurement of the particle size distribution.

Preferably, in the method of bonding using high-frequency dielectric heating adhesive sheets according to the above aspect of the invention, the first thermoplastic resin is a polyolefin resin.

Preferably, in the method of bonding using high-frequency dielectric heating adhesive sheets according to the above aspect of the invention, an absolute value of a difference between a flow start temperature Tx1 of the first thermoplastic resin and a flow start temperature Tx2 of the second thermoplastic resin satisfies a relation of a numerical formula (Numerical Formula 4) below.

$$|Tx1-Tx2| \leq 70 \quad \text{(Numerical Formula 4)}$$

According to the above aspect of the invention, there is provided a bonding method capable of firmly bonding together a first adherend and a second adherend made of different materials using high-frequency dielectric heating adhesive sheets.

DESCRIPTION OF EMBODIMENT(S)

First Exemplary Embodiment

Figure 1:
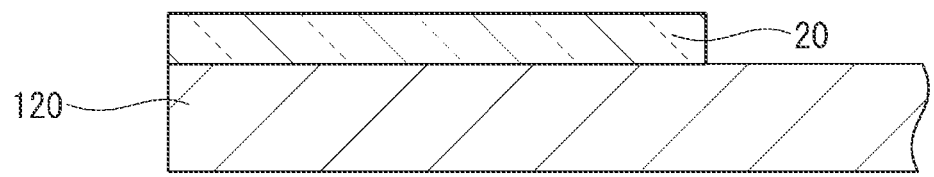
FIGS. 1(A), 1(B), and 1(C) are schematic cross-sectional views for illustrating an example of steps included in a bonding method according to a first exemplary embodiment.
Figure 1:
Figure 1:
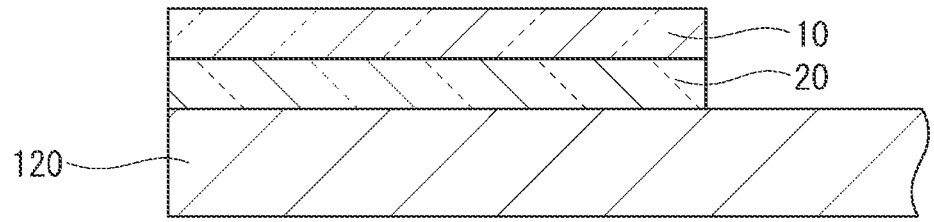
Figure 1:
Figure 1:
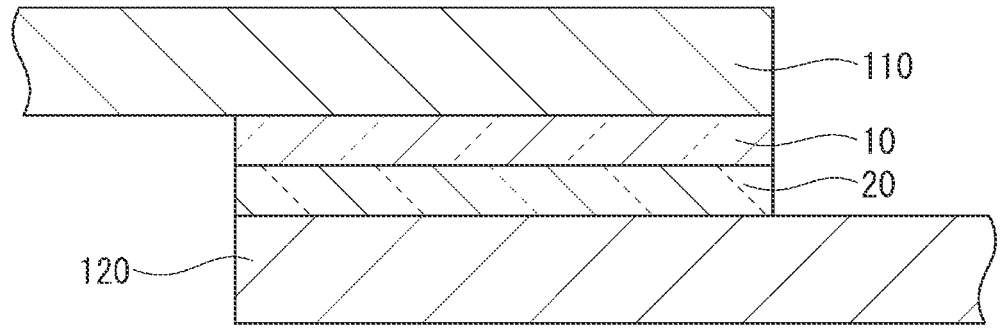

A bonding method of bonding using high-frequency dielectric heating adhesive sheets according to a first exemplary embodiment is a bonding method of bonding a first adherend and a second adherend made of a material different from the material of the first adherend together using a plurality of high-frequency dielectric heating adhesive sheets.

The plurality of high-frequency dielectric heating adhesive sheets used for the bonding method according to the present exemplary embodiment include at least a first adhesive sheet and a second adhesive sheet. It is preferable that at least one of the first adhesive sheet or the second adhesive sheet is a single-layer sheet, and it is more preferable that the first adhesive sheet and the second adhesive sheet are each a single-layer sheet.

The bonding method according to the present exemplary embodiment includes: the step of disposing the first adhesive sheet and the second adhesive sheet between the first adherend and the second adherend such that the first adhesive sheet is in contact with the first adherend and the second adhesive sheet is in contact with the second adherend; and the step of applying a high-frequency wave to the first adhesive sheet and the second adhesive sheet with the first adhesive sheet and the second adhesive sheet held between the first adherend and the second adherend to thereby bond the first adherend and the first adhesive sheet together and bond the second adherend and the second adhesive sheet together.

First, a description will be given of the high-frequency dielectric heating adhesive sheets used for the bonding method according to the present exemplary embodiment, and then a description will be given of the bonding method using the high-frequency dielectric heating adhesive sheets.

High-frequency Dielectric Heating Adhesive Sheets

The first adhesive sheet and the second adhesive sheet used as the plurality of high-frequency dielectric heating adhesive sheets used for the bonding method according to the present exemplary embodiment each contain a thermoplastic resin.

The first adhesive sheet contains a first thermoplastic resin. The second adhesive sheet contains a second thermoplastic resin. The first thermoplastic resin and the second thermoplastic resin are different resins.

The volume content VA1 of the first thermoplastic resin with respect to the total volume of all thermoplastic resins in the first adhesive sheet is in a range from 60% by volume to 100% by volume.

The volume content VA2 of the second thermoplastic resin with respect to the total volume of all thermoplastic resins in the second adhesive sheet is in a range from 60% by volume to 100% by volume.

The change rate Vx1 represented by a numerical formula (Numerical Formula 1) below and indicating a rate of change between the volume content VA1 of the first thermoplastic resin and the volume content VB1 of the first thermoplastic resin with respect to the total volume of all thermoplastic resins in a sheet disposed so as to be in direct contact with the first adhesive sheet is less than 80%.

The change rate Vx2 represented by a numerical formula (Numerical Formula 2) below and indicating a rate of change between the volume content VA2 of the second thermoplastic resin and the volume content VB2 of the second thermoplastic resin with respect to the total volume of all thermoplastic resins in a sheet disposed so as to be in direct contact with the second adhesive sheet is less than 80%.

$$Vx1=\{(VA1-VB1)/VA1\}\times 100 \quad \text{(Numerical Formula 1)}$$

$$Vx2=\{(VA2-VB2)/VA2\}\times 100 \quad \text{(Numerical Formula 2)}$$

The change rate Vx1 is preferably more than 0%, more preferably 10% or more, still more preferably 20% or more, still further more preferably 25% or more.

The change rate Vx1 is preferably 75% or less.

The change rate Vx2 is preferably more than 0%, more preferably 10% or more, still more preferably 20% or more, still further more preferably 25% or more.

The change rate Vx2 is preferably 75% or less.

The change rates Vx1 and Vx2 are the same or different.

Since both the change rates Vx1 and Vx2 are less than 80%, interfacial peeling is unlikely to occur between the adhesive sheets.

The unit of the volume contents VA1, VB1, VA2, and VB2 is % by volume.

Thermoplastic Resins

No particular limitation is imposed on the type of first thermoplastic resin and the type of second thermoplastic resin.

For example, the first thermoplastic resin and the second thermoplastic resin are each preferably at least one selected from the group consisting of polyolefin resins, polyolefin resins having a polar moiety, styrene resins, polyacetal resins, polycarbonate resins, polyacrylic resins, polyamide resins, polyimide resins, polyvinyl acetate resins, phenoxy resins, and polyester resins because these resins are easily fused and have prescribed heat resistance.

The first thermoplastic resin is preferably a polyolefin resin.

The second thermoplastic resin is preferably a styrene resin.

It is also preferable that at least one of the first thermoplastic resin or the second thermoplastic resin is a polyolefin resin or a polyolefin resin having a polar moiety. At least one of the first thermoplastic resin or the second thermoplastic resin may be a polyolefin resin having no polar moiety.

Polyolefin Resin

The polyolefin resin used as the thermoplastic resin may be, for example, a resin formed from a homopolymer such as polyethylene, polypropylene, polybutene, or polymethylpentene or an α-olefin resin formed from a copolymer of monomers selected from the group consisting of ethylene, propylene, butene, hexene, octene, 4-methylpentene, etc. The polyolefin resin used as the thermoplastic resin may be a single resin or a combination of two or more resins.

Polyolefin Resin Having Polar Moiety

No particular limitation is imposed on the polar moiety in the polyolefin resin having the polar moiety, so long as it can impart polarity to the polyolefin resin. The polyolefin resin having the polar moiety is preferred because it exerts a high adhesive force on an adherend.

The thermoplastic resin may be a copolymer of an olefin monomer and a monomer having a polar moiety. The thermoplastic resin may be a resin prepared by introducing a polar moiety through modification such as an addition reaction into an olefin polymer obtained by polymerization of an olefin monomer.

No particular limitation is imposed on the type of olefin monomer included in the polyolefin resin having a polar moiety that is used as the thermoplastic resin. Examples of the olefin monomer include ethylene, propylene, butene, hexene, octene, and 4-methyl-1-pentene. One of these olefin monomers may be used alone, or a combination of two or more of them may be used.

The olefin monomer is preferably ethylene or propylene because high mechanical strength and stable bonding properties are obtained.

A structural unit derived from an olefin in the polyolefin resin having a polar moiety is preferably a structural unit derived from ethylene or propylene.

Examples of the polar moiety include a hydroxy group, a carboxy group, a vinyl acetate structure, acid anhydride structures, and acid-modified structures introduced into the polyolefin resin by acid modification.

The acid-modified structure serving as the polar moiety is a moiety introduced by acid modification of the thermoplastic resin (for example, a polyolefin resin). Examples of a compound used for graft modification of the thermoplastic resin (for example, a polyolefin resin) include unsaturated carboxylic acid derivative components derived from any of unsaturated carboxylic acids, acid anhydrides of unsaturated carboxylic acids, and esters of unsaturated carboxylic acids.

Examples of the unsaturated carboxylic acids include acrylic acid, methacrylic acid, maleic acid, fumaric acid, itaconic acid, and citraconic acid.

Examples of the acid anhydrides of unsaturated carboxylic acids include unsaturated carboxylic acid anhydrides such as maleic anhydride, itaconic anhydride, and citraconic anhydride.

Examples of the esters of unsaturated carboxylic acids include unsaturated carboxylic acid esters such as methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalic anhydride.

When the thermoplastic resin is a copolymer of an olefin monomer and a monomer having a polar moiety, the copolymer contains a structural unit derived from the monomer having a polar moiety in an amount of preferably 2% by mass or more, more preferably 4% by mass or more, still more preferably 5% by mass or more, still further more preferably 6% by mass or more. Moreover, the copolymer contains the structural unit derived from the monomer having a polar moiety in an amount of preferably 30% by mass or less, more preferably 25% by mass or less, still more preferably 20% by mass or less, still further more preferably 15% by mass or less.

When the copolymer contains the structural unit derived from the monomer having a polar moiety in an amount of 2% by mass or more, the adhesion strength of the high-frequency dielectric heating adhesive sheets is improved. When the copolymer contains the structural unit derived from the monomer having a polar moiety in an amount of 30% by mass or less, an excessive increase in the tackiness of the thermoplastic resin can be prevented. Therefore, the occurrence of difficulties during molding of the high-frequency dielectric heating adhesive sheets can be easily prevented.

When the polyolefin resin used as the thermoplastic resin includes the acid-modified structure, the rate of acid modification is preferably 0.01% by mass or more, more preferably 0.1% by mass or more, still more preferably 0.2% by mass or more.

When the polyolefin resin used as the thermoplastic resin includes the acid-modified structure, the rate of acid modification is preferably 30% by mass or less, more preferably 20% by mass or less, still more preferably 10% by mass or less.

In the case where the thermoplastic resin includes the acid-modified structure, when the rate of acid modification is 0.01% by mass or more, the adhesion strength of the high-frequency dielectric heating adhesive sheets is improved. When the rate of acid modification is 30% by mass or less, an excessive increase in the tackiness of the thermoplastic resin can be prevented. Therefore, the occurrence of difficulties during molding of the high-frequency dielectric heating adhesive sheets can be easily prevented.

In the present description, the modification rate is the percentage of the mass of the moiety derived from the acid with respect to the total mass of the acid-modified polyolefin.

Maleic Anhydride-modified Polyolefin

More preferably, the polyolefin resin used as the thermoplastic resin includes an acid anhydride structure as the acid-modified structure. The acid anhydride structure is preferably a structure introduced when the polyolefin resin is modified with maleic anhydride.

In the maleic anhydride-modified polyolefin, it is preferable that the rate of modification with maleic anhydride is in the same range as the range of the modification rate when the polyolefin resin used as the thermoplastic resin includes the acid-modified structure, and the effects obtained when the modification rate is in this range are the same as those when the polyolefin resin used as the thermoplastic resin includes the acid-modified structure.

The structural unit derived from the olefin in the maleic anhydride-modified polyolefin is preferably a structural unit derived from ethylene or propylene. Specifically, the maleic anhydride-modified polyolefin is preferably a maleic anhydride-modified polyethylene resin or a maleic anhydride-modified polypropylene resin.

Olefin-vinyl Acetate Copolymer Resin

It is also preferable that the thermoplastic resin in the present exemplary embodiment is a copolymer containing a structural unit derived from an olefin and a structural unit derived from vinyl acetate (an olefin-vinyl acetate copolymer resin).

Preferably, the olefin-vinyl acetate copolymer resin used as the thermoplastic resin contains the structural unit derived from vinyl acetate within the same range as that for the structural unit derived from the monomer having a polar moiety when the thermoplastic resin is the copolymer of the olefin monomer and the monomer having a polar moiety, and the effects obtained in the above range are the same as those when the thermoplastic resin is the copolymer of the olefin monomer and the monomer having a polar moiety.

The structural unit derived from an olefin in the olefin-vinyl acetate copolymer resin is preferably a structural unit derived from ethylene or propylene because high mechanical strength and stable bonding properties are obtained.

Therefore, the thermoplastic resin is preferably at least one of an ethylene-vinyl acetate copolymer resin or a propylene-vinyl acetate copolymer resin, more preferably an ethylene-vinyl acetate copolymer resin. The percentage (% by mass) of the structural unit derived from vinyl acetate in the ethylene-vinyl acetate copolymer resin or the propylene-vinyl acetate copolymer resin is also preferably within the same range as that described above for the olefin-vinyl acetate copolymer resin.

Styrene Resin

The styrene resin may be a homopolymer of a styrene monomer (polystyrene: PS). Examples thereof include a homopolymer of styrene, a homopolymer of α-methylstyrene, and a homopolymer of β-methylstyrene.

The PS may be a general-purpose polystyrene resin (GPPS resin) or a high-impact polystyrene resin (HIPS resin) containing the GPPS resin and a rubber-like elastic body.

The styrene resin is, for example, a resin obtained by copolymerization of a styrene monomer such as α-methylstyrene or β-methylstyrene and an aliphatic monomer and may be a hydrogenated styrene resin obtained by hydrogenating the above styrene resin.

The styrene resin is also preferably a styrene elastomer. Examples of the styrene elastomer include styrene-conjugated diene copolymers and styrene-olefin copolymers. Specific examples of the styrene-conjugated diene copolymers include: non-hydrogenated styrene-conjugated diene copolymers such as styrene-butadiene copolymers, styrene-butadiene-styrene (SBS) copolymers, styrene-butadiene/butylene-styrene copolymers, styrene-isoprene copolymers, styrene-isoprene-styrene (SIS) copolymers, and styrene-ethylene/isoprene-styrene copolymers; and hydrogenated styrene-conjugated diene copolymers such as styrene-ethylene/propylene-styrene (SEPS) copolymers and styrene-ethylene/butylene-styrene (SEBS) copolymers. Industrial examples of the styrene elastomer include trade names such as Tufprene (manufactured by Asahi Kasei Corporation), KRATON (manufactured by Kraton Polymers Japan Ltd.), Sumitomo TPE-SB (manufactured by Sumitomo Chemical Co., Ltd.), EPOFRIEND (manufactured by Daicel Corporation), RABALON (manufactured by Mitsubishi Chemical Corporation), SEPTON (manufactured by KURARAY Co., Ltd.), and TUFTEC (manufactured by Asahi Kasei Corporation). The styrene elastomer may be a hydrogenated product or a non-hydrogenated product.

Acrylic Resin

Preferably, the acrylic resin is a homopolymer of a (meth)acrylate such as polymethyl methacrylate (PMMA) or polymethyl acrylate (PMA) or a copolymer of at least one of a monomer unit derived from methyl methacrylate (MMA) or a monomer unit derived from methyl acrylate (MA) with a monomer unit derived from at least one additional monomer. The acrylic resin may be at least one selected from the group consisting of these homopolymers and copolymers or may be a mixture of two or more of them. In the present description, the term "(meth)acrylic acid" is a concept intended to encompass both "acrylic acid" and "methacrylic acid."

Examples of the additional monomer copolymerizable with at least one of MMA or MA include: alkyl (meth)acrylates including an alkyl group having 2 to 18 carbon atoms; α,β-unsaturated acids such as acrylic acid and methacrylic acid; unsaturated group-containing divalent carboxylic acids such as maleic acid, fumaric acid, and itaconic acid, and alkyl esters of the unsaturated group-containing divalent carboxylic acids; aromatic vinyl compounds such as styrene, α-methylstyrene, and nuclear-substituted styrenes; vinyl cyanide compounds such as acrylonitrile and methacrylonitrile; maleic anhydride; maleimide; and N-substituted maleimides. The additional monomer copolymerizable with at least one of MMA or MA may be at least one selected from the group consisting of these monomers or may be two or more of them.

In the bonding method according to the present exemplary embodiment, it is preferable that the absolute value of the difference between the flow start temperature Tx1 of the first thermoplastic resin and the flow start temperature Tx2 of the second thermoplastic resin satisfies the relation of the following numerical formula (Numerical Formula 4).

$$|Tx1-Tx2| \leq 70 \quad \text{(Numerical Formula 4)}$$

The absolute difference |Tx1-Tx2| between the flow start temperatures Tx1 and Tx2 is more preferably 60 degrees C. or less, still more preferably 50 degrees C. or less, still further more preferably 40 degrees C. or less.

The absolute difference |Tx1-Tx2| between the flow start temperatures Tx1 and Tx2 is generally 0 degrees C. or more.

When the absolute difference between Tx1 and Tx2 is 70 degrees C. or less, the adhesion between the first adhesive sheet and the second adhesive sheet in contact with the first adhesive sheet tends to be high.

The flow start temperature of a thermoplastic resin can be measured using a method described later in Examples.

At least one of the first thermoplastic resin or the second thermoplastic resin is also preferably a thermoplastic resin that generates heat under application of a high-frequency wave.

The thermoplastic resin that generates heat under application of a high-frequency wave is preferably a thermoplastic resin that generates heat when a high-frequency voltage in a frequency range from 3 MHz to 300 MHz is applied.

The thermoplastic resin that generates heat under application of a high-frequency wave is more preferably a thermoplastic resin that generates heat under application of a high-frequency voltage with a frequency of, for example, 13.56 MHz, 27.12 MHz, or 40.68 MHz in the frequency range from 3 MHz to 300 MHz.

Dielectric Filler

Preferably, at least one of the first adhesive sheet or the second adhesive sheet contains a dielectric filler that generates heat under application of a high-frequency wave. The dielectric filler contained in the first adhesive sheet may be referred to as a first dielectric filler. The dielectric filler contained in the second adhesive sheet may be referred to as a second dielectric filler.

The first dielectric filler and the second dielectric filler are each a filler that generates heat under application of a high-frequency wave.

Preferably, the first dielectric filler and the second dielectric filler are each a filler that generates heat under application of a high-frequency voltage in the frequency range from 3 MHz to 300 MHZ. Preferably, the first dielectric filler and the second dielectric filler are each a filler that generates heat under application of a high-frequency voltage with a frequency of, for example, 13.56 MHz, 27.12 MHz, or 40.68 MHz in the frequency range from 3 MHz to 300 MHz.

Types

Preferably, the first dielectric filler and the second dielectric filler are each independently one or a combination of two or more of zinc oxide, silicon carbide (SIC), titanium oxide, barium titanate, barium titanate zirconate, lead titanate, potassium niobate, hydrated aluminum silicate, inorganic materials having crystal water such as hydrated aluminosilicates of alkali metals, and inorganic materials having crystal water such as hydrated aluminosilicates of alkaline earth metals. The type of first dielectric filler and the type of second dielectric filler are the same or different.

Preferably, at least one of the first dielectric filler or the second dielectric filler is at least one selected from the group consisting of zinc oxide, silicon carbide, titanium oxide, and barium titanate.

Preferably, the first dielectric filler and the second dielectric filler are each independently at least one selected from the group consisting of zinc oxide, silicon carbide, titanium oxide, and barium titanate.

Among the dielectric fillers exemplified above, zinc oxide is more preferred as at least one of the first dielectric filler or the second dielectric filler because there are variety of types of zinc oxide, because a suitable one can be selected from zinc oxide fillers with different shapes and sizes, and because the bonding properties and mechanical properties of the high-frequency dielectric heating adhesive sheets can be improved according to their intended application. When zinc oxide is used as the dielectric fillers, colorless high-frequency dielectric heating adhesive sheets can be obtained. Among the dielectric fillers, zinc oxide has a lower density. Therefore, when high-frequency dielectric heating adhesive sheets containing zinc oxide as the dielectric fillers are used to bond adherends together, the total weight of the joined body can be smaller than that when sheets containing other dielectric fillers are used. The hardness of zinc oxide is not excessively high as compared to those of other ceramics. Therefore, a device for manufacturing the high-frequency dielectric heating adhesive sheets is unlikely to be damaged. Zinc oxide is an inert oxide. Therefore, even when mixed with a thermoplastic resin, zinc oxide causes less damage to the thermoplastic resin.

Preferably, titanium oxide used as the dielectric fillers is at least one of anatase-type titanium oxide or rutile-type titanium oxide. Anatase-type titanium oxide is more preferred because of its good dielectric property.

Volume Contents

At least one of the volume content of the first dielectric filler in the first adhesive sheet or the volume content of the second dielectric filler in the second adhesive sheet is preferably 5% by volume or more, more preferably 8% by volume or more.

At least one of the volume content of the first dielectric filler in the first adhesive sheet or the volume content of the second dielectric filler in the second adhesive sheet is preferably 50% by volume or less, more preferably 40% by volume or less, still more preferably 35% by volume or less.

When the volume content of the first dielectric filler is 5% by volume or more, it can be easy to firmly bond the first adhesive sheet and the first adherend together.

When the volume content of the second dielectric filler is 5% by volume or more, it can be easy to firmly bond the second adhesive sheet and the second adherend together.

When the volume content of the first dielectric filler is 50% by volume or less, the first adhesive sheet can easily have high flexibility, and a reduction in toughness can be easily prevented. Therefore, the adhesive sheet can be easily formed into a desired shape.

When the volume content of the second dielectric filler is 50% by volume or less, the second adhesive sheet can easily have high flexibility, and a reduction in toughness can be easily prevented. Therefore, the adhesive sheet can be easily formed into a desired shape.

When the volume content of the first dielectric filler and the volume content of the second dielectric filler are both 5% by volume or more, the first adherend and the second adherend, which are different materials, can be firmly bonded together with ease using the bonding method according to the present exemplary embodiment.

When the volume content of the first dielectric filler and the volume content of the second dielectric filler are both 50% by volume or less, both the first adhesive sheet and the second adhesive sheet can easily have high flexibility, and a reduction in toughness can be easily prevented. Therefore, the adhesive sheets can be easily formed into a desired shape.

The volume content of the first dielectric filler in the first adhesive sheet and the volume content of the second dielectric filler in the second adhesive sheet are the same or different.

Volume Average Particle Sizes

At least one of the volume average particle size of the first dielectric filler or the volume average particle size of the second dielectric filler is preferably 1 μm or more, more preferably 2 μm or more, still more preferably 3 μm or more.

At least one of the volume average particle size of the first dielectric filler or the volume average particle size of the second dielectric filler is preferably 30 μm or less, more preferably 25 μm or less, still more preferably 20 μm or less.

When the volume average particle size of the first dielectric filler in the first adhesive sheet is 1 μm or more, the first adhesive sheet can exhibit high heat generation performance during application of a high-frequency wave.

When the volume average particle size of the first dielectric filler in the first adhesive sheet is 30 μm or less, a reduction in the strength of the first adhesive sheet can be prevented, and the first adhesive sheet can exhibit high heat generation performance during application of a high-frequency wave.

When the volume average particle size of the second dielectric filler in the second adhesive sheet is 1 μm or more, the second adhesive sheet can exhibit high heat generation performance during application of a high-frequency wave.

When the volume average particle size of the second dielectric filler in the second adhesive sheet is 30 μm or less, a reduction in the strength of the second adhesive sheet can be prevented, and the second adhesive sheet can exhibit high heat generation performance during application of a high-frequency wave.

When the volume average particle size of the first dielectric filler and the volume average particle size of the second dielectric filler are both 1 μm or more, both the first adhesive sheet and the second adhesive sheet can exhibit high heat generation performance during application of a high-frequency wave, and the first adherend and the second adherend can be firmly bonded together in a shorter time.

When the volume average particle size of the first dielectric filler and the volume average particle size of the second dielectric filler are both 30 μm or less, a reduction in the strength of the high-frequency dielectric heating adhesive sheets can be prevented, and the adhesive sheets as a whole can exhibit high heat generation performance during application of a high-frequency wave.

The volume average particle size of the first dielectric filler in the first adhesive sheet and the volume average particle size of the second dielectric filler in the second adhesive sheet are the same or different.

The volume average particle size of each dielectric filler is measured by the following method. The particle size distribution of the dielectric filler is measured by a laser diffraction/scattering method, and the volume average particle size is computed according to JIS Z 8819-2:2001 using the results of the particle size distribution measurement.

Additives

The high-frequency dielectric heating adhesive sheets in the present exemplary embodiment may contain additives or may not contain additives. When the high-frequency dielectric heating adhesive sheets in the present exemplary embodiment contain additives, it is preferable that at least one of the first adhesive sheet or the second adhesive sheet contains the additives.

When the high-frequency dielectric heating adhesive sheets in the present exemplary embodiment contain additives, examples of the additives include a tackifier, a plasticizer, a wax, a coloring agent, an antioxidant, an ultraviolet absorber, an antimicrobial agent, a coupling agent, a viscosity modifier, an organic filler, and an inorganic filler. The organic filler and the inorganic filler used as additives differ from the dielectric fillers.

The tackifier and the plasticizer can improve the fusion properties and bonding properties of the high-frequency dielectric heating adhesive sheets.

Examples of the tackifier include rosin derivatives, polyterpene resins, aromatic-modified terpene resins, hydrogenated products of aromatic-modified terpene resins, terpene phenol resins, coumarone-indene resins, aliphatic petroleum resins, aromatic petroleum resins, and hydrogenated products of aromatic petroleum resins.

Examples of the plasticizer include petroleum process oil, natural oil, dibasic acid dialkyl esters, and low-molecular weight liquid polymers. Examples of the petroleum process oil include paraffin process oil, naphthene process oil, and aromatic process oil. Examples of the natural oil include castor oil and tall oil. Examples of the dibasic acid dialkyl include dibutyl phthalate, dioctyl phthalate, and dibutyl adipate. Examples of the low-molecular weight liquid polymers include liquid polybutene and liquid polyisoprene.

When the high-frequency dielectric heating adhesive sheets in the present exemplary embodiment contain additives, the content of the additives in each high-frequency dielectric heating adhesive sheet is generally preferably 0.01% by mass or more, more preferably 0.05% by mass or more, still more preferably 0.1% by mass or more based on the total mass of the high-frequency dielectric heating adhesive sheet. The content of the additives in the high-frequency dielectric heating adhesive sheet is preferably 20% by mass or less, more preferably 15% by mass or less, still more preferably 10% by mass or less.

Preferably, the high-frequency dielectric heating adhesive sheets in the present exemplary embodiment do not contain carbon or carbon compounds composed mainly of carbon (such as carbon black) and electrically conductive materials such as metals. The contents of the electrically conductive materials in each high-frequency dielectric heating adhesive sheet are each independently preferably 5% by mass or less, more preferably 1% by mass or less, still more preferably 0.1% by mass or less, still further more preferably 0% by mass based on the total mass of the high-frequency dielectric heating adhesive sheet.

When the content of the electrically conductive materials in each high-frequency dielectric heating adhesive sheet is 5% by mass or less, undesirable dielectric breakdown that occurs during dielectric heating and causes carbonization of the bonded portions and the adherends can be easily prevented.

In the high-frequency dielectric heating adhesive sheets in the present exemplary embodiment, at least one of the total mass of the thermoplastic resin and the dielectric filler in the first adhesive sheet with respect to the entire mass of the first adhesive sheet and the total mass of the thermoplastic resin or the dielectric filler in the second adhesive sheet with respect to the entire mass of the second adhesive sheet is preferably 80% by mass or more, more preferably 90% by mass or more, still more preferably 99% by mass or more.

The total mass of the thermoplastic resins and the dielectric fillers in the high-frequency dielectric heating adhesive sheets in the present exemplary embodiment with respect to the entire mass of the high-frequency dielectric heating adhesive sheets is preferably 80% by mass or more, more preferably 90% by mass or more, still more preferably 99% by mass or more.

Properties and Forms of High-frequency Dielectric Heating Adhesive Sheets

Thicknesses of High-frequency Dielectric Heating Adhesive Sheets

At least one of the thickness of the first adhesive sheet or the thickness of the second adhesive sheet is preferably 5 μm or more, more preferably 25 μm or more, still more preferably 50 μm or more.

At least one of the thickness of the first adhesive sheet or the thickness of the second adhesive sheet is preferably 1000 μm or less, more preferably 500 μm or less, still more preferably 300 μm or less.

When the thickness of the first adhesive sheet is 5 μm or more, its heat generation performance under application of a high-frequency wave is improved.

When the thickness of the second adhesive sheet is 5 μm or more, its heat generation performance under application of a high-frequency wave is improved.

When the thickness of the first adhesive sheet is 1000 μm or less, the weight of the first adhesive sheet is not excessively large.

When the thickness of the second adhesive sheet is 1000 μm or less, the weight of the second adhesive sheet is not excessively large.

When the first adhesive sheet and the second adhesive sheet that are in contact with the respective adherends both have a thickness of 5 μm or more, both the heat generation performance of the first adhesive sheet and the heat generation performance of the second adhesive sheet under application of a high-frequency wave are improved, so that the adherends can be firmly bonded together in a short time.

When the first adhesive sheet and the second adhesive sheet both have a thickness of 1000 μm or less, the weight of the first adhesive sheet and the weight of the second adhesive sheet are not excessively large, so that the increase in the weight of the joined body obtained by bonding the adherends together due to the weights of the adhesive sheets can be reduced.

The thicknesses of the first adhesive sheet and the second adhesive sheet used as the high-frequency dielectric heating adhesive sheets in the present exemplary embodiment are the same or different.

In the high-frequency dielectric heating adhesive sheets in the present exemplary embodiment, at least one of the ratio $T_1/D_{F1}$ of the thickness $T_1$ of the first adhesive sheet to the average particle size $D_{F1}$ of the first dielectric filler or the ratio $T_2/D_{F2}$ of the thickness $T_2$ of the second adhesive sheet to the average particle size $D_{F2}$ of the second dielectric filler is preferably 1 or more, more preferably 2 or more, still more preferably 3 or more, still further more preferably 5 or more.

At least one of the ratio $T_1/D_{F1}$ or the ratio $T_2/D_{F2}$ is preferably 2500 or less, preferably 2000 or less, preferably 1750 or less, more preferably 1000 or less, still more preferably 500 or less, still further more preferably 100 or less, yet still further more preferably 50 or less.

When the ratio $T_1/D_{F1}$ is 1 or more, a reduction in adhesion strength due to contact between the first dielectric filler and an adherend during bonding can be prevented.

When the ratio $T_2/D_{F2}$ is 1 or more, a reduction in adhesion strength due to contact between the second dielectric filler and an adherend during bonding can be prevented.

When the ratio $T_1/D_{F1}$ is 2500 or less, a load on a sheet manufacturing device during manufacturing of the first adhesive sheet can be reduced.

When the ratio $T_2/D_{F2}$ is 2500 or less, a load on the sheet manufacturing device during manufacturing of the second adhesive sheet can be reduced.

When the ratio $T_1/D_{F1}$ and the ratio $T_2/D_{F2}$ are both 1 or more, a reduction in adhesion strength due to contact between the dielectric filler in the first adhesive sheet and an adherend during bonding and also a reduction in adhesion strength due to contact between the dielectric filler in the second adhesive sheet and an adherend during bonding can be prevented.

When the ratio $T_1/D_{F1}$ and the ratio $T_2/D_{F2}$ are both 2500 or less, a load on the sheet manufacturing device during manufacturing of the high-frequency dielectric heating adhesive sheets can be reduced.

The ratio $T_1/D_{F1}$ and the ratio $T_2/D_{F2}$ are the same or different.

The total thickness of the plurality of high-frequency dielectric heating adhesive sheets disposed between the first adherend and the second adherend is preferably 10 μm or more, more preferably 30 μm or more, still more preferably 50 μm or more.

When the total thickness of the plurality of high-frequency dielectric heating adhesive sheets is 10 μm or more, sufficient adhesion strength is likely to be easily obtained.

No particular limitation is imposed on the upper limit of the total thickness of the plurality of high-frequency dielectric heating adhesive sheets. As the total thickness of the adhesive sheets increases, the weight of the joined body as a whole obtained by bonding the first adherend and the second adherends together increases. It is therefore preferable that the total thickness of the adhesive sheets is a thickness that does not cause any practical problem. In consideration of the practicality and formability of the high-frequency dielectric heating adhesive sheets, the total thickness of the adhesive sheets is preferably 2000 μm or less, more preferably 1000 μm or less, still more preferably 600 μm or less.

Dielectric Property (tan δ/ε'r) of High-frequency Dielectric Heating Adhesive Sheets The dielectric properties, i.e., the dielectric dissipation factor (tan δ) and relative dielectric constant (ε'r), of each of the first adhesive sheet and the second adhesive sheet can be simply and accurately measured using an impedance material analyzer.

At least one of the dielectric property (tan δ/s'r) of the first adhesive sheet or the dielectric property (tan δ/s'r) of the second adhesive sheet is preferably 0.005 or more, more preferably 0.008 or more, still more preferably 0.01 or more. The dielectric property (tan δ/s'r) of each of the high-frequency dielectric heating adhesive sheets is preferably 0.08 or less, more preferably 0.05 or less. The dielectric property (tan δ/s'r) is a value obtained by dividing the dielectric dissipation factor (tan δ) measured using, for example, an impedance material device by the relative dielectric constant (ε'r) measured using, for example, the impedance material device.

When the dielectric property of the first adhesive sheet is 0.005 or more, a prescribed amount of heat can be generated during dielectric heating, so that difficulty in obtaining firm bonding between the first adhesive sheet and an adherend due to insufficient heat generation can be avoided.

When the dielectric property of the second adhesive sheet is 0.005 or more, a prescribed amount of heat can be generated during dielectric heating, so that difficulty in obtaining firm bonding between the second adhesive sheet and an adherend due to insufficient heat generation can be avoided.

When the dielectric property of the first adhesive sheet is 0.08 or less, the adherend in contact with the first adhesive sheet is unlikely to be damaged.

When the dielectric property of the second adhesive sheet is 0.08 or less, the adherend in contact with the second adhesive sheet is unlikely to be damaged.

When the dielectric property of the first adhesive sheet and the dielectric property of the second adhesive sheet are both 0.005 or more, the above problem can be prevented both in the first adhesive sheet and the second adhesive sheet in contact with the respective adherends, so that the adherends can be firmly bonded together with ease.

When the dielectric property of the first adhesive sheet and the dielectric property of the second adhesive sheet are both 0.08 or less, the adherend in contact with the first adhesive sheet and the adherend in contact with the second adhesive sheet are unlikely to be damaged.

The detail of the method for measuring the dielectric property of each of the high-frequency dielectric heating adhesive sheets is as follows. The high-frequency dielectric heating adhesive sheet is cut into a prescribed size, and the relative dielectric constant (&'r) and dielectric dissipation factor (tan δ) of the cut sheet are measured using an RF impedance material analyzer E4991A (manufactured by Agilent) under the conditions of 23 degrees C. and a frequency of 40.68 MHz. Then the value of the dielectric property (tan δ/ε'r) is computed.

Method for Producing High-frequency Dielectric Heating Adhesive Sheets

No particular limitation is imposed on the method for producing the first adhesive sheet and the second adhesive sheet used as the high-frequency dielectric heating adhesive sheets in the present exemplary embodiment.

When the first adhesive sheet and the second adhesive sheet are each a single-layer sheet, each adhesive sheet can be produced as follows. The components described above are pre-mixed and kneaded using a well-known kneader such as an extruder or a heat roller, and a well-known molding method such as extrusion molding, calendering, injection molding, or cast molding is performed.

Bonding Method

In the bonding method according to the present exemplary embodiment, the first adhesive sheet and the second adhesive sheet are used to bond the first adherend and the second adherend made of different materials.

Preferably, the first adherend contains the third thermoplastic resin, and the main component of the first thermoplastic resin in the first adhesive sheet is the same as the main component of the third thermoplastic resin. The first adhesive sheet is bonded to the first adherend.

Preferably, the second adherend contains the fourth thermoplastic resin, and the main component of the second thermoplastic resin in the second adhesive sheet is the same as the main component of the fourth thermoplastic resin. The second adhesive sheet is bonded to the second adherend.

Preferably, the third thermoplastic resin and the fourth thermoplastic resin are each independently a resin appropriately selected from the thermoplastic resins described for the first adhesive sheet and the second adhesive sheet.

In the present description, the "main component of a thermoplastic resin" when the thermoplastic resin is, for example, a polymer containing different repeating units means one of the repeating units with the largest content in the polymer. When the thermoplastic resin is a polymer derived from a single monomer, this monomer unit (repeating unit) is the "main component of the thermoplastic resin." When the thermoplastic resin is a copolymer, one of repeating units with the largest content in the polymer is the "main component of the thermoplastic resin." When the thermoplastic resin is a copolymer, the "main component of the thermoplastic resin" of the copolymer is a repeating unit (monomer unit) contained in an amount of 30% by mass or more. In one mode, the "main component" is a repeating unit contained in an amount of more than 30% by mass. In another mode, the "main component" is a repeating unit contained in an amount of 40% by mass or more. In yet another mode, the "main component" is a repeating unit contained in an amount of 50% by mass or more. When the thermoplastic resin is a copolymer, the number of repeating units with the largest content may be two or more.

When, for example, the first thermoplastic resin is an ethylene-vinyl acetate copolymer containing 50% by mass or more of an ethylene unit as a repeating unit and the third thermoplastic resin is also an ethylene-vinyl acetate copolymer containing 50% by mass or more of an ethylene unit as a repeating unit, the main component (repeating unit) of the first thermoplastic resin and the main component (repeating unit) of the third thermoplastic resin are both ethylene, and the main component of the first thermoplastic resin and the main component of the third thermoplastic resin are the same.

When, for example, the first thermoplastic resin is a maleic anhydride-modified polypropylene containing 50% by mass or more of a propylene unit as a repeating unit and the third thermoplastic resin is polypropylene, the main component (repeating unit) of the first thermoplastic resin and the main component (repeating unit) of the third thermoplastic resin are both propylene, and the main component of the first thermoplastic resin and the main component of the third thermoplastic resin are the same.

For example, for a thermoplastic resin composed of a homopolymer, the repeating unit forming the polymer is the main component of the thermoplastic resin. For example, when the first thermoplastic resin is polyethylene and the third thermoplastic resin is also polyethylene, the main component (repeating unit) of the first thermoplastic resin and the main component (repeating unit) of the third thermoplastic resin are both ethylene, and the main component of the first thermoplastic resin and the main component of the third thermoplastic resin are the same.

The same can apply to the "main component of the thermoplastic resin" in the second thermoplastic resin and that in the fourth thermoplastic resin.

Examples of the combination of the first thermoplastic resin and the third thermoplastic resin and the combination of the second thermoplastic resin and the fourth thermoplastic resin include the following combinations.

(R1) polyethylene and ethylene-vinyl acetate copolymer
(R2) polyethylene and EMAA (ethylene-methyl methacrylate copolymer)

(R3) polyethylene and EMA (ethylene-methacrylate copolymer)
(R4) polyethylene and ethylene cycloolefin copolymer
(R5) polypropylene and modified polypropylene
(R6) PS and SEBS
(R7) PS and SBR (styrene-butadiene rubber)
(R8) PS and SEES (styrene-ethylene-ethylene-styrene block copolymer)
(R9) PS and ABS (acrylonitrile-butadiene-styrene copolymer)
(R10) PS and SIS Preferably, the surface of the first adherend that is in direct contact with the first adhesive sheet is formed of the third thermoplastic resin. It is also preferable that the entire first adherend is formed of the third thermoplastic resin. When the first adherend has a multilayer structure, it is also preferable that a layer of the first adherend that is located at the outermost position (the outermost layer of the first adherend) is formed of the third thermoplastic resin.

When the entire first adherend or the outermost layer of the first adherend is formed of a resin blend prepared by mixing a plurality of resins, the volume content of the third thermoplastic resin in the entire first adherend or the outermost layer of the first adherend is preferably 50% by volume or more, more preferably 60% by volume or more, still more preferably 70% by volume or more, still further more preferably 80% by volume or more, yet still further more preferably 90% by volume or more.

Preferably, the surface of the second adherend that is in direct contact with the second adhesive sheet is formed of the fourth thermoplastic resin. It is also preferable that the entire second adherend is formed of the fourth thermoplastic resin. When the second adherend has a multilayer structure, it is also preferable that a layer of the second adherend that is located at the outermost position (the outermost layer of the second adherend) is formed of the fourth thermoplastic resin. When the entire second adherend or the outermost layer of the second adherend is formed of a resin blend prepared by mixing a plurality of resins, the volume content of the fourth thermoplastic resin in the entire second adherend or the outermost layer of the second adherend is preferably 50% by volume or more, more preferably 60% by volume or more, still more preferably 70% by volume or more, still further more preferably 80% by volume or more, yet still further more preferably 90% by volume or more.

No particular limitation is imposed on the shape of the first adherend and the shape of the second adherend, but it is preferable that the first and second adherends have a sheet shape. The shape of the first adherend and the second adherend may be formed of any of the materials described above, and the shape of the first adherend may be the same as or different from the shape and size of the second adherend.

Preferably, the bonding method according to the present exemplary embodiment includes the following steps P1 and P2.

Step P1

Step P1 is the step of disposing the adhesive sheets in the present exemplary embodiment between the first adherend and the second adherend. In step P1, the first adherend is brought into contact with the first adhesive sheet. In step P1, the second adherend is brought into contact with the second adhesive sheet.

Preferably, step P1 is any of step P11 of disposing the first adhesive sheet and the second adhesive sheet each formed from a single-layer sheet one by one so as to be in simple contact with each other without integration, step P12 of disposing a stack of the first adhesive sheet and the second adhesive sheet produced in advance without integration, and step P13 of disposing the first adhesive sheet and the second adhesive sheet that have been integrated in advance. Examples of the integration method include thermal lamination and stamping. For example, the first adhesive sheet and the second adhesive sheet may be stacked together and stamped (die-cut). The edges of the die-cut sheets are thereby compressed to integrate the sheets in a pseudo manner.

In the bonding method according to the present exemplary embodiment, it is preferable that the sheet in direct contact with the first adhesive sheet is the second adhesive sheet. In this case, the relations for the change rates Vx1 and Vx2 represented by the numerical formulae (Numerical Formula 1) and (Numerical Formula 2) are satisfied between the first adhesive sheet and the second adhesive sheet.

FIG. 1 shows schematic cross-sectional views for illustrating an example of the bonding method according to the present exemplary embodiment. FIG. 1 shows, as an example of step P11, a procedure for disposing a first adhesive sheet 10 and a second adhesive sheet 20 between a first adherend 110 and a second adherend 120.

FIG. 1(A) is an illustration showing the step of disposing the second adhesive sheet 20 on the second adherend 120 such that they are in contact with each other.

FIG. 1(B) is an illustration showing the step of, subsequent to FIG. 1(A), disposing the first adhesive sheet 10 on the second adhesive sheet 20 such that they are in direct contact with each other.

FIG. 1(C) is an illustration showing the step of, subsequent to FIG. 1(B), disposing the first adherend 110 on the first adhesive sheet 10 such that they are in contact with each other.

In FIG. 1, the sheet in direct contact with the first adhesive sheet 10 is the second adhesive sheet 20. When the first adhesive sheet 10 and the second adhesive sheet 20 are in direct contact with each other, the meanings of the symbols in the numerical formulas (Numerical Formula 1) and (Numerical Formula 2) are as follows.

VA1: the volume content of the first thermoplastic resin with respect to the total volume of all thermoplastic resins in the first adhesive sheet 10.

VB1: the volume content of the first thermoplastic resin with respect to the total volume of all thermoplastic resins in the second adhesive sheet 20.

VA2: the volume content of the second thermoplastic resin with respect to the total volume of all the thermoplastic resins in the second adhesive sheet 20.

VB2: the volume content of the second thermoplastic resin with respect to the total volume of all the thermoplastic resins in the first adhesive sheet 10.

Figure 2:
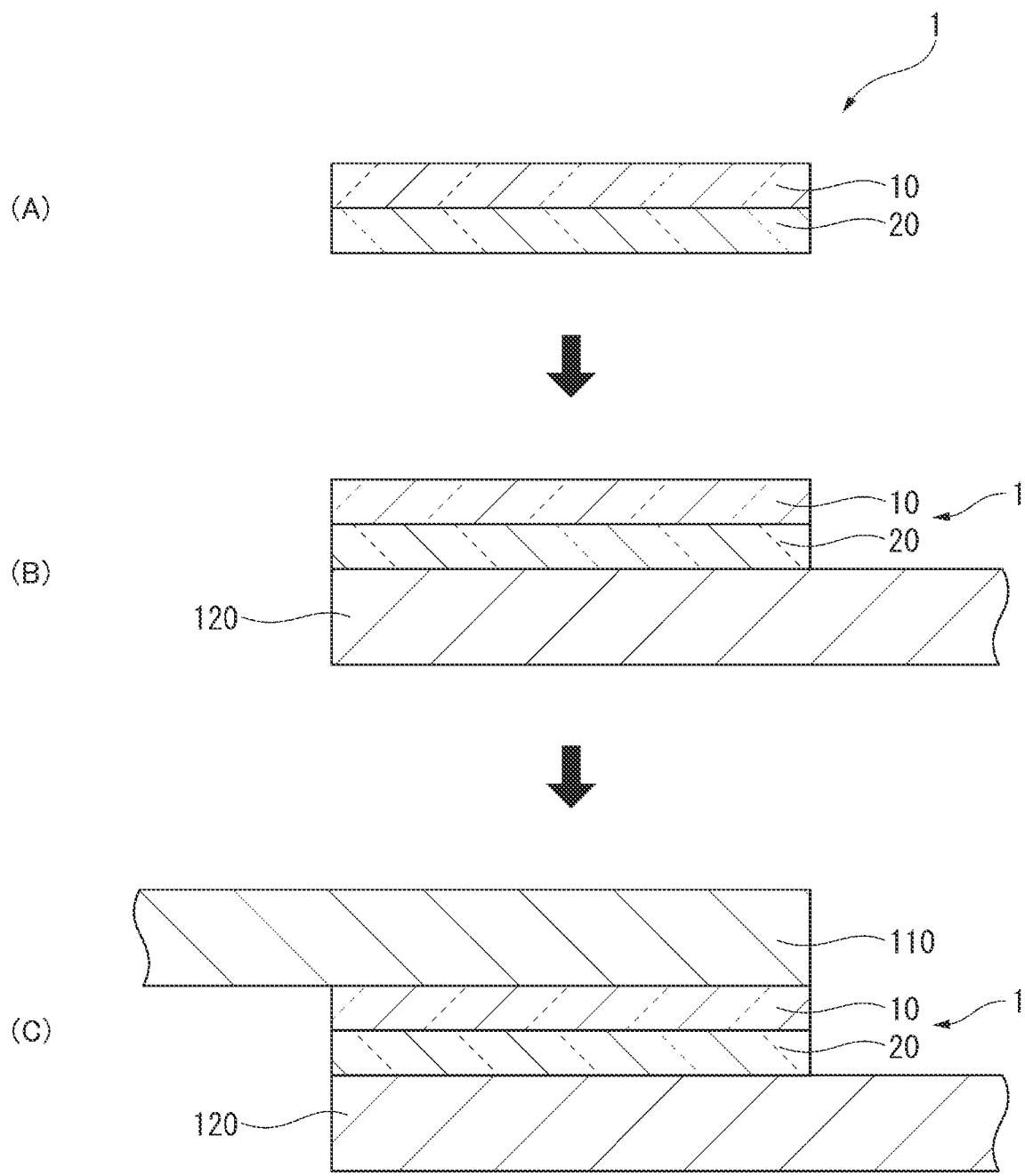
FIGS. 2(A), 2(B), and 2(C) are schematic cross-sectional views for illustrating another example of the steps included in the bonding method according to the first exemplary embodiment.

FIG. 2 shows schematic cross-sectional views for illustrating an example of the bonding method according to the present exemplary embodiment. FIG. 2 shows, as an example of step P13, a procedure for stacking the first adhesive sheet 10 and the second adhesive sheet 20 such that they are in direct contact with each other, subjecting the first adhesive sheet 10 and the second adhesive sheet 20 to thermal lamination treatment etc. to obtain integrated high-frequency dielectric heating adhesive sheets 1, and then disposing the high-frequency dielectric heating adhesive sheets 1 between the first adherend 110 and the second adherend 120.

FIG. 2(A) is an illustration showing the step of directly stacking the first adhesive sheet 10 and the second adhesive sheet 20 together to obtain the integrated high-frequency dielectric heating adhesive sheets 1.

FIG. 2(B) is an illustration showing the step of, subsequent to FIG. 2(A), disposing the high-frequency dielectric heating adhesive sheets 1 on the second adherend 120 such that the second adhesive sheet 20 side of the integrated high-frequency dielectric heating adhesive sheets 1 is in contact with the second adherend 120.

FIG. 2(C) is an illustration showing the step of, subsequent to FIG. 2(B), disposing the first adherend 110 on the high-frequency dielectric heating adhesive sheets 1 such that the first adherend 110 is in contact with the first adhesive sheet 10 side of the integrated high-frequency dielectric heating adhesive sheets 1.

It is only necessary that the first adhesive sheet and the second adhesive sheet are disposed between the first adherend and the second adherend such that the first adherend and the second adherend are bonded together. It is only necessary that the first adhesive sheet and the second adhesive sheet are in contact with part of the first adherend and part of the second adherend, respectively, at a plurality of points, or over the entire bonding surfaces. From the viewpoint of improving the adhesion strength between the first adherend and the second adherend, it is preferable that the first adhesive sheet and the second adhesive sheet are in contact with the entire bonding surface of the first adherend and the entire bonding surface of the second adherend, respectively. Examples of the exemplary embodiment in which the first adhesive sheet and the second adhesive sheet are held between part of the first adherend and part of the second adherend include the exemplary embodiment in which the first adhesive sheet and the second adhesive sheet each having a frame shape are disposed along the outer circumferences of the bonding surfaces of the first adherend and the second adherend such that the first adhesive sheet and the second adhesive sheet are in contact with the first adherend and the second adherend, respectively. When the frame-shaped first adhesive sheet and the frame-shaped second adhesive sheet are disposed as described above, while the adhesion strength between the first adherend and the second adherend is ensured, the weight of the joined body can be reduced as compared to that when the first adhesive sheet and the second adhesive sheet are disposed over the entire bonding surfaces. In the exemplary embodiment in which the first adhesive sheet and the second adhesive sheet are disposed partially between the first adherend and the second adherend, the sizes of the first and second adhesive sheets used can be reduced. Therefore, the time for high-frequency dielectric heating can be shorter than that when the first adhesive sheet and the second heat-adhesive sheet are disposed over the entire bonding surfaces.

Step P2

Step P2 is the step of bonding the first adherend and the first adhesive sheet together and bonding the second adherend and the second adhesive sheet together. In step P2, the first adhesive sheet and the second adhesive sheet disposed in step P1 are held between the first adherend and the second adherend, and a high-frequency wave is applied to the first adhesive sheet and the second adhesive sheet. In step P2, a dielectric heating adhesion device, for example, is used, and a high-frequency voltage can thereby be applied to the high-frequency dielectric heating adhesive sheets.

In contrast to the bonding method in FIG. 2 in which the plurality of adhesive sheets are stacked in advance, in the bonding method in FIG. 1, the adhesive sheets are disposed one by one between the first adherend and the second adherend. In this case, in step P2, the adherends and the respective adhesive sheets are bonded together, and also the adhesive sheets are bonded together. Even when the plurality of adhesive sheets have been temporarily fixed together in advance, the adhesive sheets are more firmly bonded together under application of the high-frequency wave.

Figure 3:
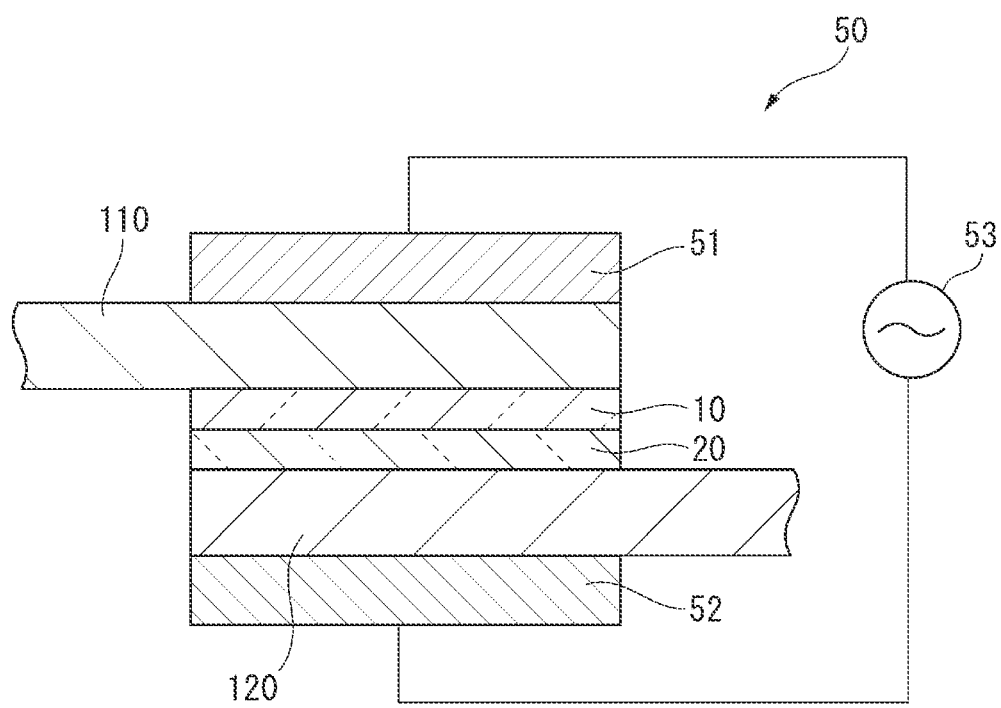
FIG. 3 is a schematic illustration for describing high-frequency dielectric heating using high-frequency dielectric heating adhesive sheets in the first exemplary embodiment and a dielectric heating device.

FIG. 3 shows a schematic illustration for describing high-frequency dielectric heating using the high-frequency dielectric heating adhesive sheets in the present exemplary embodiment and a dielectric heating device.

Dielectric Heating Adhesion Device

FIG. 3 shows a schematic illustration of a dielectric heating adhesion device 50.

The dielectric heating adhesion device 50 includes a first high-frequency electrode 51, a second high-frequency electrode 52, and a high-frequency power source 53.

The first high-frequency electrode 51 and the second high-frequency electrode 52 are disposed so as to face each other. The first high-frequency electrode 51 and the second high-frequency electrode 52 each include a press mechanism. The press mechanisms allow the first adherend 110, the high-frequency dielectric heating adhesive sheets (the first adhesive sheet 10 and the second adhesive sheet 20), and the second adherend 120 to be subjected to press treatment between the first high-frequency electrode 51 and the second high-frequency electrode 52.

When the first high-frequency electrode 51 and the second high-frequency electrode 52 form a pair of parallel flat electrodes, this electrode arrangement may be referred to as a parallel flat-plate type.

It is also preferable that a high-frequency dielectric heater of the parallel flat-plate type is used to apply a high-frequency wave. With the high-frequency dielectric heater of the parallel flat-plate type, the high-frequency wave passes through the high-frequency dielectric heating adhesive sheets (the first adhesive sheet 10 and the second adhesive sheet 20) located between the electrodes. Therefore, the entire high-frequency dielectric heating adhesive sheets can be heated, and the adherends and the high-frequency dielectric heating adhesive sheets can be bonded together in a short time.

The high-frequency power source 53 is connected to the first high-frequency electrode 51 and the second high-frequency electrode 52 and used to apply thereto a high-frequency voltage with a frequency of, for example, about 13.56 MHz, about 27.12 MHz, or about 40.68 MHz.

As shown in FIG. 3, the dielectric heating adhesion device 50 subjects the first adherend 110 and the second adherend 120 to dielectric heating through the high-frequency dielectric heating adhesive sheets (the first adhesive sheet 10 and the second adhesive sheet 20) held between the first adherend 110 and the second adherend 120. Moreover, the dielectric heating adhesion device 50 performs, in addition to the dielectric heating, pressurizing treatment using the first high-frequency electrode 51 and the second high-frequency electrode 52 to thereby bond the first adherend 110 and the second adherend 120 together. The first adherend 110 and the second adherend 120 may be bonded together without the pressurizing treatment.

When the first adhesive sheet 10 and the second adhesive sheet 20 have not been stacked and integrated together in advance, the first adhesive sheet 10 and the second adhesive sheet 20 are bonded together during the dielectric heating.

In the case where the first adhesive sheet 10 and the second adhesive sheet 20 in the high-frequency dielectric heating adhesive sheets contain a dielectric filler (not shown), when a high-frequency electric field is applied between the first high-frequency electrode 51 and the second high-frequency electrode 52, the dielectric filler absorbs the high-frequency energy.

The dielectric filler functions as a heat source, and the heat generated by the dielectric filler causes the thermoplastic resin components in the first adhesive sheet 10 and the second adhesive sheet 20 to melt. This allows the first adherend 110 and the second adherend 120 to be finally bonded together firmly even when the treatment time is short. When the adhesive sheets contain no dielectric filler, a thermoplastic resin that can generate heat under application of a high-frequency wave is used so as to function as a heat source.

The first high-frequency electrode 51 and the second high-frequency electrode 52 have the press mechanisms and therefore function also as a pressing device. Therefore, while the first adherend 110 and the second adherend 120 are pressed in a compression direction by the first high-frequency electrode 51 and the second high-frequency electrode 52, the high-frequency dielectric heating adhesive sheets (the first adhesive sheet 10 and the second adhesive sheet 20) are heated and melted, so that the first adherend 110 and the second adherend 120 can be more firmly bonded together.

High-frequency Dielectric Heating Adhesion Conditions

The high-frequency dielectric heating adhesion conditions may be changed as needed but are preferably as follows.

The high-frequency output is preferably 10 W or more, more preferably 30 W or more, still more preferably 50 W or more, still further more preferably 80 W or more.

The high-frequency output is preferably 50,000 W or less, more preferably 20,000 W or less, still more preferably 15,000 W or less, still further more preferably 10,000 W or less, yet still further more preferably 1,000 W or less.

When the high-frequency output is 10 W or more, it is possible to avoid a problem in that the temperature is not easily increased during dielectric heating, so that good adhesive force can be easily obtained.

When the high-frequency output is 50,000 W or less, it can be easy to avoid a problem in that temperature control during dielectric heating is difficult.

The application time of the high-frequency wave is preferably 1 second or longer.

The application time of the high-frequency wave is preferably 60 seconds or shorter, more preferably 45 seconds or shorter, still more preferably 35 seconds or shorter, still further more preferably 25 seconds or shorter, yet still further more preferably 10 seconds or shorter.

When the application time of the high-frequency wave is 1 second or longer, it is possible to avoid a problem in that the temperature is not easily increased during dielectric heating, so that good adhesive force can be easily obtained.

When the application time of the high-frequency wave is 60 seconds or shorter, problems such as a reduction in the efficiency of producing the joined body including the first adherend and the second adherend bonded together, an increase in the production cost of the joined body, and thermal deterioration of the adherends can be easily prevented.

The frequency of the high-frequency wave applied is preferably 1 kHz or more, more preferably 1 MHz or more, still more preferably 5 MHz or more, still further more preferably 10 MHz or more.

The frequency of the high-frequency wave applied is preferably 300 MHz or less, more preferably 100 MHz or less, still more preferably 80 MHz or less, still further more preferably 50 MHz or less. Specifically, any of 13.56 MHZ, 27.12 MHz, and 40.68 MHz, which are industrial frequency bands allocated by the International Telecommunication Union, is used for the high-frequency dielectric heating adhesion method (bonding method) of the present exemplary embodiment.

The bonding method according to the present exemplary embodiment is a bonding method for bonding a first adherend and a second adherend made of a material different from the material of the first adherend using a plurality of high-frequency dielectric heating adhesive sheets. In the first adhesive sheet and the second adhesive sheet used for the bonding method according to the present exemplary embodiment, the change rates Vx1 and Vx2 represented by the numerical formulae (Numerical Formula 1) and (Numerical Formula 2) are less than 80%. Therefore, with the bonding method according to the present exemplary embodiment, the first adherend and the second adherend made of different materials can be firmly bonded together. With the bonding method according to the present exemplary embodiment, the first adhesive sheet and the second adhesive sheet are unlikely to be peeled apart.

In the bonding method according to the present exemplary embodiment, the first adhesive sheet and the second adhesive sheet are prepared separately according to the material of the first adherend and the material of the second adherend and disposed between the adherends, and then high-frequency dielectric heating is performed. In this manner, the first adherend and the second adherend can be bonded together. Therefore, the bonding method according to the present exemplary embodiment can provide bonding flexibly applicable to different adherend materials. Specifically, it is unnecessary to produce and prepare in advance a multilayer adhesive sheet having compositions suitable for the materials of the first adherend and the second adherend, and it is only necessary to prepare single-layer sheets.

The high-frequency dielectric heating adhesive sheets (the first and second adhesive sheets) used for the bonding method according to the present exemplary embodiment can be handled more easily than when an adhesive that needs to be applied is used, and the workability during bonding of the first adherend and the second adherend is also improved. With the bonding method according to the present exemplary embodiment, the high-frequency dielectric heating adhesive sheets can be bonded to the adherends under application of a high-frequency wave in a shorter time.

With the bonding method according to the present exemplary embodiment, only prescribed portions can be heated locally from the outside using the dielectric heating adhesion device. Therefore, even when the adherends are large three-dimensional structures having complicated shapes or thick three-dimensional structures having complicated shapes and high dimensional accuracy is required, the bonding method according to the present exemplary embodiment is effective.

The high-frequency dielectric heating adhesive sheets used for the bonding method according to the present exemplary embodiment have higher water resistance and moisture resistance than general adhesives.

The high-frequency dielectric heating adhesive sheets used for the bonding method according to the present exemplary embodiment contain no solvent. Therefore, a problem with VOC (Volatile Organic Compounds) caused by an adhesive used to bond adherends is unlikely to occur.

The high-frequency dielectric heating adhesive sheets used for the bonding method according to the present exemplary embodiment are heated by applying a high-frequency voltage, so that the high-frequency dielectric heating adhesive sheets are heated locally. Therefore, with the high-frequency dielectric heating adhesive sheets in the present exemplary embodiment, it can be easy to avoid a problem in that the entire adherends are melted when the adherends are bonded together.

With the high-frequency dielectric heating adhesive sheets used for the bonding method according to the present exemplary embodiment, the thicknesses etc. of the high-frequency dielectric heating adhesive sheets can be appropriately controlled. Therefore, the high-frequency dielectric heating adhesive sheets in the present exemplary embodiment are applicable to a roll-to-roll method. Moreover, the high-frequency dielectric heating adhesive sheets can be, for example, stamped into any area and shape according to the contact area between the sheets and the adherends and the shapes of the adherends. Therefore, the high-frequency dielectric heating adhesive sheets used for the bonding method according to the present exemplary embodiment are significantly advantageous also from the viewpoint of their manufacturing process.

Second Exemplary Embodiment

In a bonding method according to a second exemplary embodiment, an intermediate sheet is further disposed between the first adhesive sheet and the second adhesive sheet. The plurality of high-frequency dielectric heating adhesive sheets used for the bonding method according to the present exemplary embodiment include at least the first adhesive sheet, the second adhesive sheet, and the intermediate sheet. The bonding method according to the present exemplary embodiment differs from the bonding method according to the first exemplary embodiment in that the intermediate sheet is used and is the same as the bonding method according to the first exemplary embodiment and the high-frequency dielectric heating adhesive sheets in the first exemplary embodiment in terms of other features. Therefore, in the following description, differences from the first exemplary embodiment will be mainly described, and redundant description will be omitted or simplified. The same components as those in the first exemplary embodiment will be denoted by the same symbols, and their description will be omitted or simplified.

Intermediate Sheet

In the present exemplary embodiment, the intermediate sheet preferably contains one or a plurality of thermoplastic resins, more preferably contains the first thermoplastic resin and the second thermoplastic resin.

In the present exemplary embodiment, it is preferable that the intermediate sheet is in direct contact with at least one of the first adhesive sheet or the second adhesive sheet. It is also preferable that the intermediate sheet is in direct contact with both the first adhesive sheet and the second adhesive sheet.

In the present exemplary embodiment, when the first adhesive sheet and the intermediate sheet are in direct contact with each other and the second adhesive sheet and the intermediate sheet are in direct contact with each other, the meanings of the symbols in the numerical formulae (Numerical Formula 1) and (Numerical Formula 2) are as follows.

VA1: the volume content of the first thermoplastic resin with respect to the total volume of all thermoplastic resins in the first adhesive sheet.

VB1: the volume content of the first thermoplastic resin with respect to the total volume of all thermoplastic resins in the intermediate sheet.

VA2: the volume content of the second thermoplastic resin with respect to the total volume of all thermoplastic resins in the second adhesive sheet.

VB2: the volume content of the second thermoplastic resin with respect to the total volume of all the thermoplastic resins in the intermediate sheet.

In the present exemplary embodiment also, it is preferable that the first adhesive sheet, the intermediate sheet, and the second adhesive sheet satisfy the relations for the change rates Vx1 and Vx2 that are the same as those in the first exemplary embodiment.

In the present exemplary embodiment, it is preferable that the intermediate sheet contains a third dielectric filler that generates heat under application of a high-frequency wave. When the intermediate sheet contains the third dielectric filler, the intermediate sheet also generates heat under application of a high-frequency voltage, so that the first adhesive sheet and the second adhesive sheet in contact with the intermediate sheet can be easily melted in a short time. Therefore, in the present exemplary embodiment, the first adherend and the second adherend can be firmly bonded together in a shorter time.

The third dielectric filler used may be the same dielectric filler as the first dielectric filler or the second dielectric filler described in the first exemplary embodiment. The third dielectric filler may be the same as or different from the first dielectric filler. The third dielectric filler may be the same as or different from the second dielectric filler.

Preferably, the first dielectric filler, the second dielectric filler, and the third dielectric filler are each independently at least one selected from the group consisting of zinc oxide, silicon carbide, titanium oxide, and barium titanate.

The first dielectric filler, the second dielectric filler, and the third dielectric filler are preferably the same dielectric filler, more preferably zinc oxide.

The volume average particle size and volume content of the third dielectric filler may be the same as or different from the volume average particle size and volume content of the first dielectric filler. The volume average particle size and volume content of the third dielectric filler may be the same as or different from the volume average particle size and volume content of the second dielectric filler.

It is also preferable that the intermediate sheet does not contain the third dielectric filler that generates heat under application of a high-frequency wave. When the intermediate sheet does not contain the third dielectric filler, the intermediate sheet does not generate heat when a high-frequency voltage is applied thereto, so that the first adhesive sheet, the intermediate sheet, and the second adhesive sheet are not melted excessively and are easily prevented from coming out from the bonding surfaces between the adherends.

The high-frequency dielectric heating adhesive sheets in the present exemplary embodiment may contain additives or may not contain additives. When the high-frequency dielectric heating adhesive sheets in the present exemplary embodiment contain additives, it is preferable that at least one of the first adhesive sheet, the intermediate sheet, or the second adhesive sheet contains the additives. For example, the same additives as those described in the first exemplary embodiment can also be used for the high-frequency dielectric heating adhesive sheets in the present exemplary embodiment.

In the high-frequency dielectric heating adhesive sheets in the present exemplary embodiment also, it is preferable that the ratio $T_1/D_{F1}$ of the thickness $T_1$ of the first adhesive sheet to the average particle size $D_{F1}$ of the first dielectric filler satisfies the same relation as that in the first exemplary embodiment.

In the high-frequency dielectric heating adhesive sheets in the present exemplary embodiment also, it is preferable that the ratio $T_2/D_{F2}$ of the thickness $T_2$ of the second adhesive sheet to the average particle size $D_{F2}$ of the second dielectric filler satisfies the same relation as that in the first exemplary embodiment.

Thicknesses of High-frequency Dielectric Heating Adhesive Sheets

In the high-frequency dielectric heating adhesive sheets in the present exemplary embodiment also, it is preferable that the thickness of the first adhesive sheet and the thickness of the second adhesive sheet are each independently within the thickness range described in the first exemplary embodiment.

The thickness of the intermediate sheet is preferably 5 μm or more, more preferably 25 μm or more, still more preferably 50 μm or more.

The thickness of the intermediate sheet is preferably 1000 μm or less, more preferably 500 μm or less, still more preferably 300 μm or less.

When the thickness of the intermediate sheet is 5 μm or more, the intermediate sheet can be easily formed.

When the thickness of the intermediate sheet is 1000 μm or less, the weight of the intermediate sheet is not excessively large.

In the present exemplary embodiment also, the total thickness of the plurality of high-frequency dielectric heating adhesive sheets disposed between the first adherend and the second adherend is preferably 10 μm or more, more preferably 15 μm or more, still more preferably 30 μm or more, still further more preferably 50 μm or more because of the same reasons as those in the first exemplary embodiment.

The total thickness of the plurality of high-frequency dielectric heating adhesive sheets disposed between the first adherend and the second adherend is preferably 2000 μm or less, more preferably 1000 μm or less, still more preferably 600 μm or less because of the same reasons as those in the first exemplary embodiment.

Method for Producing High-frequency Dielectric Heating Adhesive Sheets

No particular limitation is imposed on the method for producing the first adhesive sheet, the intermediate sheet, and the second adhesive sheet used as the high-frequency dielectric heating adhesive sheets in the present exemplary embodiment, and they can be produced, for example, using the same method as that in the first exemplary embodiment.

Bonding Method

The bonding method according to the present exemplary embodiment is a method for bonding the first adherend and the second adherend together using the high-frequency dielectric heating adhesive sheets in the present exemplary embodiment. The main components of the thermoplastic resins in the adherends are the same as the main components of the thermoplastic resins in the respective adhesive sheets, as in the first exemplary embodiment.

Preferably, the bonding method according to the present exemplary embodiment includes the following steps PX1 and PX2.

Step PX1

Step PX1 is the step of disposing the first adhesive sheet, the intermediate sheet, and the second adhesive sheet in the present exemplary embodiment between the first adherend and the second adherend. In step PX1, the first adherend is bought into contact with the first adhesive sheet, and the second adherend is brought into contact with the second adhesive sheet. Then the intermediate sheet is disposed between the first adhesive sheet and the second adhesive sheet.

Preferably, step PX1 is any of step PX11 of disposing the first adhesive sheet, the intermediate sheet, and the second adhesive sheet each formed of a single-layer sheet one by one so as to be in simple contact with each other without integration, step PX12 of disposing a stack of the first adhesive sheet, the intermediate sheet, and the second adhesive sheet produced in advance without integration, and step PX13 of disposing the first adhesive sheet, the intermediate sheet, and the second adhesive sheet that have been integrated in advance. No particular limitation is imposed on the method for integrating the adhesive sheets and the intermediate sheet. For example, thermal lamination, stamping, etc. described in the first exemplary embodiment may be used.

Figure 4:
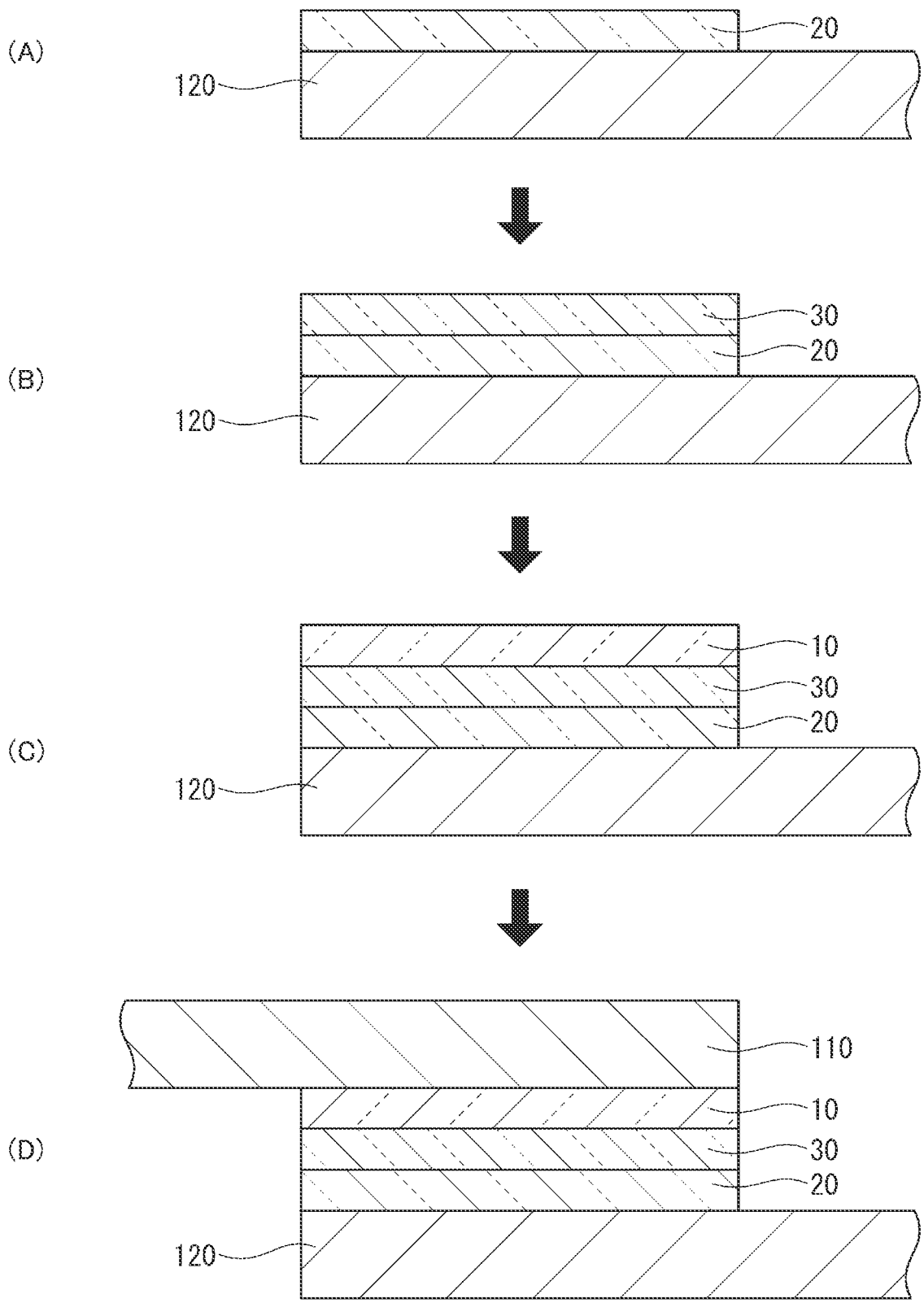
FIGS. 4(A), 4(B), 4(C) and 4(D) are schematic cross-sectional views for illustrating an example of steps included in a bonding method according to a second exemplary embodiment.

FIG. 4 shows schematic cross-sectional views for illustrating an example of the bonding method according to the present exemplary embodiment. FIG. 4 shows, as an example of step PX11, a procedure for disposing a first adhesive sheet 10, an intermediate sheet 30, and a second adhesive sheet 20 between a first adherend 110 and a second adherend 120.

FIG. 4(A) is an illustration showing the step of disposing the second adhesive sheet 20 on the second adherend 120 such that they are in contact with each other.

FIG. 4(B) is an illustration showing the step of, subsequent to FIG. 4(A), disposing the intermediate sheet 30 on the second adhesive sheet 20 such that the intermediate sheet 30 is in direct contact with the second adhesive sheet 20.

FIG. 4(C) is an illustration showing the step of, subsequent to FIG. 4(B), disposing the first adhesive sheet 10 on the intermediate sheet 30 such that the first adhesive sheet 10 is in direct contact with the intermediate sheet 30. FIG. 4(D) is an illustration showing the step of, subsequent to FIG. 4(C), disposing the first adherend 110 on the first adhesive sheet 10 such that the first adherend 110 is in contact with the first adhesive sheet 10.

Figure 5:
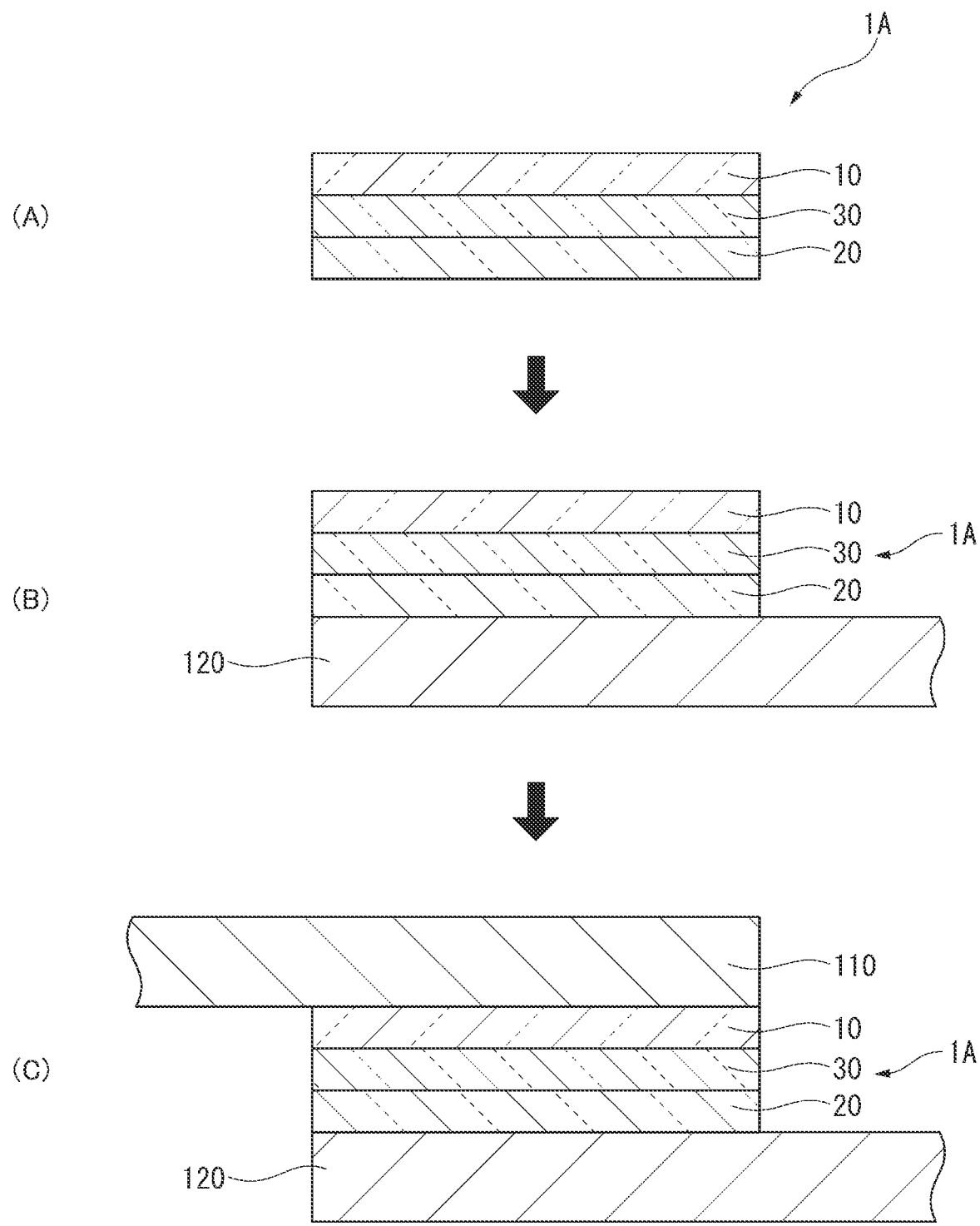
FIGS. 5(A), 5(B), and 5(C) are schematic cross-sectional views for illustrating another example of the steps included in the bonding method according to the second exemplary embodiment.

FIG. 5 shows schematic cross-sectional views for illustrating an example of the bonding method according to the present exemplary embodiment. FIG. 5 shows, as an example of step PX13, a procedure for stacking the first adhesive sheet 10, the intermediate sheet 30, and the second adhesive sheet 20 such that they are in direct contact with each other, subjecting the first adhesive sheet 10, the intermediate sheet 30, and the second adhesive sheet 20 to thermal lamination treatment etc. to obtain integrated high-frequency dielectric heating adhesive sheets 1A, and then disposing the high-frequency dielectric heating adhesive sheets 1A between the first adherend 110 and the second adherend 120.

FIG. 5(A) is an illustration showing the step of stacking the first adhesive sheet 10, the intermediate sheet 30, and the second adhesive sheet 20 in this order to obtain the integrated high-frequency dielectric heating adhesive sheets 1A.

FIG. 5(B) is an illustration showing the step of, subsequent to FIG. 5(A), disposing the high-frequency dielectric heating adhesive sheets 1A on the second adherend 120 such that the second adhesive sheet 20 side of the high-frequency dielectric heating adhesive sheets 1A is in contact with the second adherend 120.

FIG. 5(C) is an illustration showing the step of, subsequent to FIG. 5(B), disposing the first adherend 110 on the high-frequency dielectric heating adhesive sheets 1A such that the first adherend 110 is in contact with the first adhesive sheet 10 side of the high-frequency dielectric heating adhesive sheets 1A.

Step PX2

Step PX2 is the step of bonding the first adherend and the first adhesive sheet together and bonding the second adherend and the second adhesive sheet together. In step PX2, the first adhesive sheet, the intermediate sheet, and the second adhesive sheet disposed in step PX1 are held between the first adherend and the second adherend, and a high-frequency wave is applied to the first adhesive sheet, the intermediate sheet, and the second adhesive sheet. In step PX2 also, for example, the same dielectric heating adhesion device as that in the first exemplary embodiment may be used to apply a high-frequency voltage to the high-frequency dielectric heating adhesive sheets.

In contrast to the bonding method in FIG. 5 in which the plurality of adhesive sheets are stacked in advance, in the bonding method in FIG. 4, the adhesive sheets and the intermediate sheet are disposed one by one between the first adherend and the second adherend. In this case, in step PX2, the adhesive sheets and the intermediate sheet are bonded together while the adherends and the respective adhesive sheets are bonded together. Even when the plurality of adhesive sheets and the intermediate sheet have been temporarily fixed together in advance, the adhesive sheets and the intermediate sheet are more firmly bonded together by applying a high-frequency wave.

Figure 6:
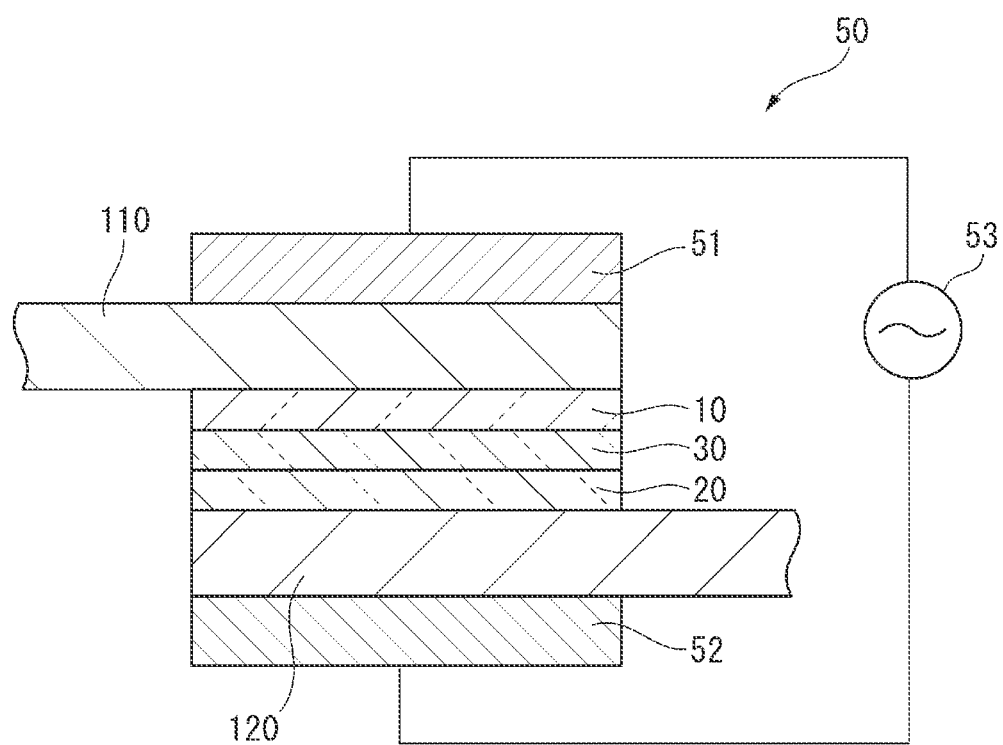
FIG. 6 is a schematic illustration for describing high-frequency dielectric heating using high-frequency dielectric heating adhesive sheets in the second exemplary embodiment and a dielectric heating device.

FIG. 6 shows a schematic illustration for describing the method for bonding the first adherend 110 and the second adherend 120 together using the dielectric heating adhesion device 50 and the high-frequency dielectric heating adhesive sheets (the first adhesive sheet 10, the intermediate sheet 30, and the second adhesive sheet 20).

The high-frequency dielectric heating adhesion conditions may be changed appropriately but are preferably the same as those described in the first exemplary embodiment.

The bonding method according to the present exemplary embodiment is also a bonding method for bonding the first adherend and the second adherend made of a material different from the material of the first adherend using the plurality of high-frequency dielectric heating adhesive sheets and exhibits the same effects as those of the first exemplary embodiment.

In the first adhesive sheet, the intermediate sheet, and the second adhesive sheet used for the bonding method according to the present exemplary embodiment, the change rates Vx1 and Vx2 represented by the numerical formulae (Numerical Formula 1) and (Numerical Formula 2) are both less than 80%. Therefore, with the bonding method according to the present exemplary embodiment, the first adherend and the second adherend made of different materials can be firmly bonded together. With the bonding method according to the present exemplary embodiment also, the first adhesive sheet and the intermediate sheet are unlikely to be peeled apart, and the second adhesive sheet and the intermediate sheet are unlikely to be peeled apart.

Modifications of Exemplary Embodiments

The invention is not limited to the above exemplary embodiments. The invention may include modifications and improvements so long as the object of the invention can be achieved.

In the examples described in the above exemplary embodiments, the high-frequency dielectric heating adhesive sheets including only two adhesive sheets, i.e., the first adhesive sheet and the second adhesive sheet, or the high-frequency dielectric heating adhesive sheets including three sheets, i.e., the first adhesive sheet, the intermediate sheet, and the second adhesive sheet, are used, but the invention is not limited to these examples. For example, in one exemplary embodiment of the invention, high-frequency dielectric heating adhesive sheets composed of a total of four or more sheets including the first adhesive sheet and the second adhesive sheet serving as the outermost layers are used.

The order of arrangement of the adhesive sheets and the intermediate sheet between the first adherend and the second adherend is not limited to the orders shown in FIGS. 1, 2, 4, and 5 in the above exemplary embodiments. For example, instead of the method in FIGS. 1 and 4 in which the adhesive sheets and the intermediate sheet are disposed one by one, a method in which the sheets are stacked without integration treatment such as thermal lamination and then the stack is disposed between the adherends may be used.

Each of the high-frequency dielectric heating adhesive sheets may have an adhesive portion. When each of the high-frequency dielectric heating adhesive sheets has the adhesive portion, positional displacement of the high-frequency dielectric heating adhesive sheets when they are disposed between the adherends can be prevented, and the adhesive sheets can be disposed at correct positions. The adhesive portion may be disposed on one side of each high-frequency dielectric heating adhesive sheet or on both sides. The adhesive portion may be disposed on part of the surfaces of the high-frequency dielectric heating adhesive sheets. Even when the high-frequency dielectric heating adhesive sheets have no adhesive portions, they can firmly bond the first adherend and the second adherend together.

The high-frequency dielectric heating is not limited to the treatment performed using the dielectric heating adhesion device described in the above exemplary embodiments and including the electrodes disposed so as to face each other, and a lattice electrode-type high-frequency dielectric heater may be used. The lattice electrode-type high-frequency dielectric heater includes a lattice electrode including first polarity electrodes and second polarity electrodes having a polarity opposite to the polarity of the first polarity electrodes, the first polarity electrodes and the second polarity electrodes being arranged alternately at regular intervals on the same plane.

When, for example, a joined body including a first adherend and a second adherend bonded together with their edges stacked together is produced, the lattice electrode-type high-frequency dielectric heater is disposed on the first adherend side or the second adherend side, and then a high-frequency wave is applied.

When the lattice electrode-type high-frequency dielectric heater is used to bond the first adherend and the second adherend together, a first lattice electrode may be disposed on the first adherend side, and a second lattice electrode may be disposed on the second adherend side. Then a high-frequency wave may be simultaneously applied with the first adherend, the high-frequency dielectric heating adhesive sheets, and the second adherend held between the first lattice electrode and the second lattice electrode.

When the lattice electrode-type high-frequency dielectric heater is used to bond the first adherend and the second adherend together, the following procedure may be used. The lattice electrode is disposed on one side of the first and second adherends, and a high-frequency wave is applied. Then the lattice electrode is disposed on the other side of the first and second adherends, and a high-frequency wave is applied.

It is also preferable that the lattice electrode-type high-frequency dielectric heater is used to apply a high-frequency wave. When the lattice electrode-type high-frequency dielectric heater is used, the adherends can be bonded together by performing dielectric heating, for example, from a surface layer side of the first and second adherends, e.g., from the adherend side on which the distance to the high-frequency dielectric heating adhesive sheets is shorter, without influence of the thicknesses of the first and second adherends. By using the lattice electrode-type high-frequency dielectric heater, the joined body can be produced with reduced energy consumption.

In the drawings of the exemplary embodiments, the dielectric heating adhesion device using the opposed electrodes is used for the purpose of simplification.

EXAMPLES

The invention will next be described by way of Examples. However, the invention is not limited to these Examples.

Method for Producing High-frequency Dielectric Heating Adhesive Sheets

Example 1

Materials for forming the first adhesive sheet were pre-mixed in a first container at a composition (% by volume) shown in Table 1. Materials for forming the second adhesive sheet were also pre-mixed in a second container at a composition (% by volume) shown in Table 1. PP in Table 1 is an abbreviation of polypropylene, and SEBS is an abbreviation of a styrene-ethylene/butylene-styrene copolymer.

PP: The main component is propylene (95% by mass or more), and its flow start temperature is 175 degrees C.

SEBS: The main component is styrene (67% by mass), and its flow start temperature is 137 degrees C.

One of the pre-mixed materials was supplied to a hopper of a 30 mm ⌀ twin-screw extruder. The temperature of a cylinder was set to 180 degrees C. or higher and 220 degrees C. or lower, and the temperature of a die was set to 220 degrees C. Then the pre-mixed material was melt-kneaded. The melt-kneaded material was cooled and then cut to produce granular pellets. Specifically, granular pellets for the first adhesive sheet and granular pellets for the second adhesive sheet were produced separately. Then the produced granular pellets were placed in hoppers of respective single-screw extruders each equipped with a T-die having a feed block. Under the conditions of a cylinder temperature of 220 degrees C. and a die temperature of 220 degrees C., film-shaped melt-kneaded products were extruded from the T dies and cooled using cooling rolls to thereby produce the first adhesive sheet (thickness: 200 μm) and the second adhesive sheet (thickness: 200 μm) used for a bonding method in Example 1.

Examples 2 to 6

In each of Examples 2 to 6, the first adhesive sheet, the second adhesive sheet, and the intermediate sheet were produced. Materials for forming the intermediate sheet were pre-mixed in a third container at a composition (% by volume) shown in Table 1. Granular pellets for the first adhesive sheet, granular pellets for the second adhesive sheet, and granular pellets for the intermediate sheet were produced at compositions (% by volume) shown in Table 1 in the same manner as in Example 1. Next, the granular pellets for the first adhesive sheet, the granular pellets for the second adhesive sheet, and the granular pellets for the intermediate sheet were placed in hoppers of respective single-screw extruders each equipped with a T-die having a feed block. The cylinder temperatures and the die temperatures were appropriately set according to the types of resins included in the sheets, and film-shaped melt-kneaded products were extruded from the T-dies and cooled using cooling rolls. The first adhesive sheets (thickness: 135 μm), the intermediate sheets (thickness: 130 μm), and the second adhesive sheets (thickness: 135 μm) used for bonding methods in Examples 2 to 5 were thereby obtained, and the first adhesive sheet (thickness: 200 μm) and the second adhesive sheet (thickness: 200 μm) used for a bonding method in Example 6 were obtained.

PMMA in Table 1 is an abbreviation of polymethyl methacrylate, and PS is an abbreviation of polystyrene. EVA is an abbreviation of an ethylene-vinyl acetate copolymer, and m-PP is an abbreviation of maleic anhydride-modified polypropylene.

PMMA: The main component is methyl methacrylate (95% by mass or more), and its flow start temperature is 165 degrees C.

PS: The main component is styrene (95% by mass or more), and its flow start temperature is 162 degrees C.

EVA: The main component is ethylene (72% by mass), and its flow start temperature is 94 degrees C.

m-PP: The main component is propylene (90% by mass or more), and its flow start temperature is 153 degrees C.

Comparative Examples 1 to 3

Adhesive sheets used for bonding methods in Comparative Examples 1 to 3 were produced in the same manner as in Example 1 except that the compositions of the materials for forming the first adhesive sheet and the second adhesive sheet were changed to compositions shown in Table 1 and that the materials were extruded and molded at a cylinder temperature and a die temperature appropriately set according to the types of resins contained in the layers of the adhesive sheets. In Comparative Examples 1 to 3, the thicknesses of the first and second adhesive sheets are the same as those in Example 1.

Comparative Example 4

Adhesive sheets used for a bonding method in Comparative Example 4 were produced in the same manner as in Example 2 except that the compositions of the materials for forming the first adhesive sheet, the intermediate sheet, and the second adhesive sheet were changed to compositions shown in Table 1 and that the materials were extruded and molded at a cylinder temperature and a die temperature appropriately set according to the types of resins contained in the layers of the adhesive sheets. In Comparative Example 4, the thicknesses of the first adhesive sheet, the intermediate sheet, and the second adhesive sheet are the same as those in Example 2.

Table 2 shows the volume contents of the thermoplastic resins in the produced first adhesive sheets, the produced second adhesive sheets, and the produced intermediate sheets and the values of the change rates Vx1 and Vx2 represented by the numerical formulae (Numerical Formula 1) and (Numerical Formula 2) described above.

High-frequency Bondability

Each of the produced high-frequency dielectric heating adhesive sheets (adhesive sheets and intermediate sheets) was cut into a size of 25 mm×12.5 mm. First adherends and second adherends made of materials shown in Table 1 were prepared. The sizes of the first adherend and the second adherend were mm×100 mm×2 mm (thickness). Among the adhesive sheets and intermediate sheets cut into the size described above, a combination of sheets shown in Table 1 was held between first and second adherends. In this case, the first adhesive sheet and the first adherend were brought into contact with each other, and the second adhesive sheet and the second adherend were brought into contact with each other. In Examples 1 and 6 and Comparative Examples 1 to 3, the first adhesive sheet and the second adhesive sheet were disposed so as to be in direct contact with each other. In Examples 2 to 5 and Comparative Example 4, the intermediate sheet was disposed between the first adhesive sheet and the second adhesive sheet so as to be in direct contact therewith.

Next, the first adherend, the high-frequency dielectric heating adhesive sheets, and the second adherend were fixed between electrodes of a high-frequency dielectric heater ("YRP-400T-A" manufactured by Yamamoto Vinita Co., Ltd.). In the fixed state, a high-frequency wave was applied under high-frequency application conditions described later to bond the high-frequency dielectric heating adhesive sheets and the adherends together, and an initial test piece was thereby produced. In these Examples, the sheets held between the first adherend and the second adherend may be collectively referred to as high-frequency dielectric heating adhesive sheets.

PP for the material of the first adherend in Table 1 is an abbreviation of polypropylene, and PMMA is an abbreviation of polymethyl methacrylate. PE is an abbreviation of polyethylene, and PS for the material of the second adherend is an abbreviation of polystyrene.

PP: The main component is propylene (95% by mass or more).

PMMA: The main component is methyl methacrylate (95% by mass or more).

PS: The main component is styrene (95% by mass or more).

PE: The main component is ethylene (70% by mass or more).

High-frequency Application Conditions
Frequency: 40.68 MHz
Output power: 200 W
Application time: 10 seconds Adhesive Force (Tensile Shearing Force)

The tensile shearing force of each of the initial test pieces obtained in the high-frequency bondability evaluation was measured as adhesive force. To measure the tensile shearing force, a universal tensile tester (Instron 5581 manufactured by Instron) was used. The tensile speed in the measurement of the tensile shearing force was 100 mm/minute. The tensile shearing force was measured according to JIS K 6850:1999.

The fracture mode of the test piece in the measurement of the tensile shearing force was observed, and the adhesive force was evaluated according to evaluation criteria shown below. The results of the adhesive force evaluation are shown in Table 1.

Fracture Mode

Cf: Cohesive fracture occurred in at least one of the adhesive sheets or the intermediate sheet.

BC: Fracture occurred in at least one of the first adherend or the second adherend.

IFs: Interfacial peeling occurred between at least two of the intermediate sheet and the adhesive sheets.

$IF_A$: Interfacial peeling occurred between the first adherend and the first adhesive sheet.

$IF_B$: Interfacial peeling occurred between the second adherend and the second adhesive sheet.

Volume Average Particle Size of Dielectric Filler

The particle size distribution of a dielectric filler was measured by a laser diffraction/scattering method. The volume average particle size was computed according to JIS Z 8819-2:2001 using the results of the particle size distribution measurement. The computed average particle size (volume average particle size) of the dielectric filler (zinc oxide) was 11 μm.

Flow Start Temperature

The flow start temperature of each of the thermoplastic resins used to produce the adhesive sheets and the intermediate sheets was measured using a falling-type flow tester (type "CFT-100D" manufactured by Shimadzu Corporation). A stroke displacement rate (mm/min) that varied as the temperature increased was measured at a load of 5.0 kg using a die with a hole shape ¢ of 2.0 mm and a length of 5.0 mm and a cylinder with an inner diameter of 11.329 mm while the measurement sample was heated at a heating rate of 10 degrees C./minute to thereby obtain a temperature dependence chart of the stroke displacement rate of the sample. In this chart, the temperature at which the stroke displacement rate started increasing again after a peak on the low-temperature side was used as the flow start temperature.

Dielectric Property

Each of the produced adhesive sheets was cut into a size of 30 mm×30 mm. A dielectric material test fixture 16453A (manufactured by Agilent) was attached to an RF impedance/material analyzer E4991A (manufactured by Agilent), and the relative dielectric constant (E'r) and dielectric dissipation factor (tan δ) of each cut high-frequency dielectric heating adhesive sheet were measured by a parallel plate method under the conditions of 23 degrees C. and a frequency of 40.68 MHz. The value of the dielectric property (tan δ/E'r) was computed based on the measurement results. For example, the dielectric properties (tan δ/a'r) of the first and second adhesive sheets in Examples 1 to 6 are shown in Table 1.

TABLE 1

| | Adhesive sheet composition [% by volume] | | | | | | | | | | | | | |
|---|---|---|---|---|---|---|---|---|---|---|---|---|---|---|
| | First adhesive sheet | | | | | | | Intermediate sheet | | | | | Second adhesive sheet | |
| | PP | PMMA | EVA | SEBS | PS | m-PP | ZnO | PP | PMMA | SEBS | PS | ZnO | PP | PMMA |
| Example 1 | 48 | 0 | 0 | 32 | 0 | 0 | 20 | — | — | — | — | — | 32 | 0 |
| Example 2 | 80 | 0 | 0 | 0 | 0 | 0 | 20 | 40 | 0 | 40 | 0 | 20 | 0 | 0 |
| Example 3 | 80 | 0 | 0 | 0 | 0 | 0 | 20 | 56 | 0 | 24 | 0 | 20 | 0 | 0 |
| Example 4 | 80 | 0 | 0 | 0 | 0 | 0 | 20 | 50 | 0 | 50 | 0 | 0 | 0 | 0 |
| Example 5 | 0 | 80 | 0 | 0 | 0 | 0 | 20 | 0 | 40 | 0 | 40 | 20 | 0 | 0 |

TABLE 1-continued

| | | | | | | | | | | | | | | |
|---|---|---|---|---|---|---|---|---|---|---|---|---|---|---|
| Example 6 | 0 | 0 | 60 | 0 | 0 | 40 | 0 | — | — | — | — | — | 0 | 0 |
| Comparative Example 1 | 40 | 0 | 0 | 40 | 0 | 0 | 20 | — | — | — | — | — | 8 | 0 |
| Comparative Example 2 | 72 | 0 | 0 | 6 | 0 | 0 | 20 | — | — | — | — | — | 40 | 0 |
| Comparative Example 3 | 80 | 0 | 0 | 0 | 0 | 0 | 20 | — | — | — | — | — | 0 | 0 |
| Comparative Example 4 | 80 | 0 | 0 | 0 | 0 | 0 | 20 | 60 | 0 | 20 | 0 | 20 | 0 | 0 |

| | Adhesive sheet composition [% by volume] Second adhesive sheet | | | | | Dielectric property tan δ/ε'r Adhesive sheet | | Adherend | | Fracture mode |
|---|---|---|---|---|---|---|---|---|---|---|
| | EVA | SEBS | PS | m-PP | ZnO | First | Second | First | Second | |
| Example 1 | 0 | 48 | 0 | 0 | 20 | 0.015 | 0.014 | PP | PS | Cf or BC |
| Example 2 | 0 | 80 | 0 | 0 | 20 | 0.015 | 0.015 | PP | PS | Cf or BC |
| Example 3 | 0 | 80 | 0 | 0 | 20 | 0.015 | 0.015 | PP | PS | Cf or BC |
| Example 4 | 0 | 30 | 0 | 0 | 20 | 0.015 | 0.015 | PP | PS | Cf or BC |
| Example 5 | 0 | 0 | 80 | 0 | 20 | 0.017 | 0.014 | PMMA | PS | Cf or BC |
| Example 6 | 36 | 0 | 0 | 54 | 10 | 0.009 | 0.012 | PE | PP | Cf or BC |
| Comparative Example 1 | 0 | 72 | 0 | 0 | 20 | — | — | PP | PS | $IF_A$ |
| Comparative Example 2 | 0 | 40 | 0 | 0 | 20 | — | — | PP | PS | $IF_B$ |
| Comparative Example 3 | 0 | 80 | 0 | 0 | 20 | — | — | PP | PS | $IF_S$ |
| Comparative Example 4 | 0 | 80 | 0 | 0 | 20 | — | — | PP | PS | $IF_S$ |

TABLE 2

| | First adhesive sheet | | | | Intermediate sheet | | | | Second adhesive sheet | | | | | |
|---|---|---|---|---|---|---|---|---|---|---|---|---|---|---|
| | First thermoplastic resin | | Second thermoplastic resin | | First thermoplastic resin | | Second thermoplastic resin | | Second thermoplastic resin | | First thermoplastic resin | | Numerical Formula 1 V×1 [%] | Numerical Formula 2 V×2 [%] |
| | Type | Content VA1 [% by volume] | Type | Content VB2 [% by volume] | Type | Content VB1 [% by volume] | Type | Content VB2 [% by volume] | Type | Content VA2 [% by volume] | Type | Content VB1 [% by volume] | | |
| Example 1 | PP | 60 | SEBS | 40 | — | — | — | — | SEBS | 60 | PP | 40 | 33.3 | 33.3 |
| Example 2 | PP | 100 | — | 0 | PP | 50 | SEBS | 50 | SEBS | 100 | — | 0 | 50.0 | 50 0 |
| Example 3 | PP | 100 | — | 0 | PP | 70 | SEBS | 30 | SEBS | 100 | — | 0 | 30.0 | 70 0 |
| Example 4 | PP | 100 | — | 0 | PP | 50 | SEBS | 50 | SEBS | 100 | — | 0 | 50.0 | 50.0 |
| Example 5 | PMMA | 100 | — | 0 | PMMA | 50 | PS | 50 | PS | 100 | — | 0 | 50.0 | 50.0 |
| Example 6 | EVA | 60 | m-PP | 40 | — | — | — | — | m-PP | 60 | EVA | 40 | 33.2 | 32 3 |
| Comparative Example 1 | PP | 50 | SEBS | 50 | — | — | — | — | SEBS | 90 | PP | 10 | 80.0 | 44.4 |
| Comparative Example 2 | PP | 90 | SEBS | 10 | — | — | — | — | SEBS | 50 | PP | 50 | 44.4 | 80.0 |
| Comparative Example 3 | PP | 100 | — | 0 | — | — | — | — | SEBS | 100 | — | 0 | 100.0 | 100.0 |
| Comparative Example 4 | PP | 100 | — | 0 | PP | 80 | SEBS | 20 | SEBS | 100 | — | 0 | 20.0 | 30 0 |

In the bonding methods in Examples 1 to 6, the compositions of the first adhesive sheet, the second adhesive sheet, and the intermediate sheet satisfy the relations for the change rates Vx1 and Vx2 represented by the numerical formulae (Numerical Formula 1) and (Numerical Formula 2). Therefore, with the bonding methods in Examples 1 to 6, the first adherend and the second adherend were firmly bonded together with no peeling between the sheets.

In the bonding method in Comparative Example 1, the volume content of the first thermoplastic resin (PP) in the first adhesive sheet was less than 60% by volume, and interfacial peeling occurred between the first adhesive sheet and the first adherend.

In the bonding method in Comparative Example 2, the volume content of the second thermoplastic resin (SEBS) in the second adhesive sheet was less than 60% by volume, and interfacial peeling occurred between the second adhesive sheet and the second adherend.

In the bonding methods in Comparative Examples 3 to 4, the compositions of the first adhesive sheet, the second adhesive sheet, and the intermediate sheet did not simultaneously satisfy the relations for the change rates Vx1 and Vx2 represented by the numerical formulae (Numerical Formula 1) and (Numerical Formula 2), and peeling occurred between the sheets.

With the bonding methods in Comparative Examples 1 to 4, the first adherend and the second adherend could not be bonded together.

The invention claimed is:

1. A bonding method of bonding together a first adherend and a second adherend made of a material different from a material forming the first adherend using a plurality of high-frequency dielectric heating adhesive sheets, wherein
   the plurality of high-frequency dielectric heating adhesive sheets include at least a first adhesive sheet and a second adhesive sheet,
   the first adhesive sheet contains a first thermoplastic resin,
   the second adhesive sheet contains a second thermoplastic resin,
   the first thermoplastic resin and the second thermoplastic resin are different resins,
   a volume content VA1 of the first thermoplastic resin with respect to a total volume of all thermoplastic resins in the first adhesive sheet is in a range from 60% by volume to 100% by volume,
   a volume content VA2 of the second thermoplastic resin with respect to a total volume of all thermoplastic resins in the second adhesive sheet is in a range from 60% by volume to 100% by volume,
   a change rate Vx1 represented by a numerical formula (Numerical Formula 1) below and indicating a rate of change between the volume content VA1 of the first thermoplastic resin and a volume content VB1 of the first thermoplastic resin with respect to a total volume of all thermoplastic resins in a sheet (1) disposed to be in direct contact with the first adhesive sheet is less than 80%,
   a change rate Vx2 represented by a numerical formula (Numerical Formula 2) below and indicating a rate of change between the volume content VA2 of the second thermoplastic resin and a volume content VB2 of the second thermoplastic resin with respect to a total volume of all thermoplastic resins in a sheet (2) disposed to be in direct contact with the second adhesive sheet is less than 80%,
   when an intermediate sheet is disposed between the first adhesive sheet and the second adhesive sheet, the sheet (2) disposed to be in direct contact with the second adhesive sheet is the intermediate sheet, and the sheet (1) disposed to be in direct contact with the first adhesive sheet is the intermediate sheet,
   when the first adhesive sheet and the second adhesive sheet are disposed to be in direct contact with each other, the sheet (2) disposed to be in direct contact with the second adhesive sheet is the first adhesive sheet, and the sheet (1) disposed to be in direct contact with the first adhesive sheet is the second adhesive sheet, and
   the bonding method comprises:
   disposing the first adhesive sheet and the second adhesive sheet between the first adherend and the second adherend such that the first adhesive sheet is in contact with the first adherend and the second adhesive sheet is in contact with the second adherend; and
   applying a high-frequency wave to the first adhesive sheet and the second adhesive sheet with the first adhesive sheet and the second adhesive sheet held between the first adherend and the second adherend to thereby bond the first adherend and the first adhesive sheet together and bond the second adherend and the second adhesive sheet together, $$Vx1 = \{(VA1 - VB1)/VA1\} \times 100 \quad \text{(Numerical Formula 1)}$$

$$Vx2 = \{(VA2 - VB2)/VA2\} \times 100 \quad \text{(Numerical Formula 2)}.$$

2. The method of bonding using high-frequency dielectric heating adhesive sheets according to claim 1, wherein
   the first adherend contains a third thermoplastic resin,
   the second adherend contains a fourth thermoplastic resin,
   a main component of the first thermoplastic resin is the same as a main component of the third thermoplastic resin, and
   a main component of the second thermoplastic resin is the same as a main component of the fourth thermoplastic resin.

3. The method of bonding using high-frequency dielectric heating adhesive sheets according to claim 1, wherein
   the intermediate sheet contains the first thermoplastic resin and the second thermoplastic resin.

4. The method of bonding using high-frequency dielectric heating adhesive sheets according to claim 1, wherein
   the sheet (1) in direct contact with the first adhesive sheet is the second adhesive sheet.

5. The method of bonding using high-frequency dielectric heating adhesive sheets according to claim 1, wherein
   at least one of the first adhesive sheet or the second adhesive sheet contains a dielectric filler that generates heat under application of a high-frequency wave.

6. The method of bonding using high-frequency dielectric heating adhesive sheets according to claim 5, wherein
   at least one of a volume content of the dielectric filler in the first adhesive sheet or a volume content of the dielectric filler in the second adhesive sheet is in a range from 5% by volume to 50% by volume.

7. The method of bonding using high-frequency dielectric heating adhesive sheets according to claim 5, wherein
   at least one of the dielectric filler in the first adhesive sheet or the dielectric filler in the second adhesive sheet contains at least one selected from the group consisting of zinc oxide, silicon carbide, titanium oxide, and barium titanate.

8. The method of bonding using high-frequency dielectric heating adhesive sheets according to claim 5, wherein at least one of a volume average particle size of the dielectric filler in the first adhesive sheet or a volume average particle size of the dielectric filler in the second adhesive sheet is in a range from 1 μm to 30 μm, and the volume average particle size is determined by measuring a particle size distribution by a laser diffraction/scattering method and computing the volume average particle size according to JIS Z 8819-2:2001 from results of the measurement of the particle size distribution.

9. The method of bonding using high-frequency dielectric heating adhesive sheets according to claim 1, wherein
the first thermoplastic resin is a polyolefin resin.

10. The method of bonding using high-frequency dielectric heating adhesive sheets according to claim 1, wherein
an absolute value of a difference between a flow start temperature $Tx1$ of the first thermoplastic resin and a flow start temperature $Tx2$ of the second thermoplastic resin satisfies a relation of a numerical formula (Numerical Formula 4) below, $$|Tx1-Tx2| \leq 70 \quad \text{(Numerical Formula 4)}.$$

* * * * *